(12) United States Patent
Lee et al.

(10) Patent No.: US 12,511,958 B2
(45) Date of Patent: Dec. 30, 2025

(54) ELECTRONIC DEVICE FOR CONTROLLING BLACK BOX MOUNTED IN VEHICLE AND OPERATION METHOD THEREOF

(71) Applicant: Samsung Electronics Co., Ltd., Suwon-si (KR)

(72) Inventors: Jaewoong Lee, Suwon-si (KR); Yoongoo Nam, Suwon-si (KR); Kiseung Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 18/413,643

(22) Filed: Jan. 16, 2024

(65) Prior Publication Data

US 2024/0221442 A1 Jul. 4, 2024

Related U.S. Application Data

(63) Continuation of application No. PCT/KR2023/020973, filed on Dec. 19, 2023.

(30) Foreign Application Priority Data

Dec. 29, 2022 (KR) .................. 10-2022-0189751

(51) Int. Cl.
*G06F 1/3231* (2019.01)
*G07C 5/08* (2006.01)

(52) U.S. Cl.
CPC ......... *G07C 5/0866* (2013.01); *G06F 1/3231* (2013.01)

(58) Field of Classification Search
CPC .... G06F 1/3231; G06F 1/3209; G06F 1/3206; G06F 1/3215; G07C 5/0866; B60R 25/31
See application file for complete search history.

(56) References Cited

U.S. PATENT DOCUMENTS

| | | |
|---|---|---|
| 10,157,542 B2 | 12/2018 | Sanji et al. |
| 10,318,313 B2 | 6/2019 | Sol |
| 11,917,094 B2 * | 2/2024 | Oman ..................... H04W 4/80 |

(Continued)

FOREIGN PATENT DOCUMENTS

| | | |
|---|---|---|
| JP | 2016-182855 A | 10/2016 |
| JP | 2021-099289 A | 7/2021 |

(Continued)

OTHER PUBLICATIONS

International Search Report dated Mar. 26, 2024, issued in International Patent Application No. PCT/KR2023/020973.

*Primary Examiner* — Raymond N Phan
(74) *Attorney, Agent, or Firm* — Jefferson IP Law, LLP

(57) ABSTRACT

An electronic device and operation method thereof for controlling a black box mounted in a vehicle are provided. The electronic device includes determining an operating mode of the black box to be a sleep mode in a state that an engine of the vehicle is turned off, transmitting, by using an ultra-wideband (UWB) communication module, a UWB signal to an object located in a vicinity of the vehicle and receiving a UWB signal from the object, identifying, based on the received UWB signal, whether the object is a device of a driver of the vehicle, and determining, based on a result of the identifying, whether to switch the operating mode of the black box from the sleep mode to an activation mode.

15 Claims, 16 Drawing Sheets

(56) References Cited

U.S. PATENT DOCUMENTS

| | | | |
|---|---|---|---|
| 2015/0158500 A1 | 6/2015 | Lee | |
| 2018/0308293 A1 | 10/2018 | Decia et al. | |
| 2019/0168712 A1* | 6/2019 | Yakovenko | B60R 25/24 |
| 2021/0183172 A1 | 6/2021 | Woo | |
| 2022/0067402 A1* | 3/2022 | An | G07C 9/00309 |
| 2022/0203935 A1 | 6/2022 | Kim | |
| 2022/0371548 A1* | 11/2022 | Ohashi | H04B 17/318 |
| 2024/0073316 A1* | 2/2024 | Bedri | G01S 13/04 |
| 2024/0294141 A1 | 9/2024 | Morosawa et al. | |
| 2024/0300444 A1* | 9/2024 | Elangovan | B60R 25/10 |

FOREIGN PATENT DOCUMENTS

| | | |
|---|---|---|
| KR | 10-2011-0087736 A | 8/2011 |
| KR | 10-2013-0026753 A | 3/2013 |
| KR | 10-2015-0067941 A | 6/2015 |
| KR | 10-1663027 B1 | 10/2016 |
| KR | 10-2018-0056473 A | 5/2018 |
| KR | 10-2021-0114301 A | 9/2021 |
| KR | 10-2333470 B1 | 12/2021 |
| KR | 10-2024-0030827 A | 3/2024 |

\* cited by examiner

ELECTRONIC DEVICE FOR CONTROLLING BLACK BOX MOUNTED IN VEHICLE AND OPERATION METHOD THEREOF

CROSS-REFERENCE TO RELATED APPLICATION(S)

This application is a continuation application, claiming priority under § 365(c), of an International application No. PCT/KR2023/020973, filed on Dec. 19, 2023, which is based on and claims the benefit of a Korean patent application number 10-2022-0189751, filed on Dec. 29, 2022, in the Korean Intellectual Property Office, the disclosure of which is incorporated by reference herein in its entirety.

TECHNICAL FIELD

The disclosure relates to an electronic device for controlling an operation of a black box mounted in a vehicle and an operation method of the electronic device. More particularly, the disclosure relates to an electronic device and operation method thereof for recognizing an object in a vicinity of a vehicle and determining whether to switch an operating mode of a black box according to the recognized object.

BACKGROUND ART

A black box mounted in a vehicle refers to a device that obtains images of the surroundings of a vehicle by photographing the vicinity around the vehicle when the vehicle is driving, parked, and/or stopped and stores the obtained images, and is a type of drive video record system (DVRS). To detect events that occur not only while a vehicle is driving but also while it is parked or stopped (e.g., damage to the vehicle due to a minor collision, a rear-end accident, or the like, or theft of items from the vehicle), a black box is required to operate even when a vehicle's engine is turned off, which causes the vehicle's battery to drain. In an attempt to address this issue, a technology has been used to wake up a black box only when a radar mounted on a vehicle detects the approach of a person or object in an area within a certain distance around the vehicle.

Automotive radars used in the related art are capable of determining a distance of a person or object in an area within a certain range around a vehicle. However, the radars of the related art are unable to recognize who is in close proximity to the vehicle or from which direction an object or another vehicle is approaching. Therefore, because a black box in the vehicle operates even when a driver of the vehicle is approaching the vehicle, this causes unnecessary power consumption. In addition, when a black box includes a plurality of cameras and uses the plurality of cameras to detect people or objects approaching from all directions around the vehicle, the black box may unnecessarily operate the plurality of cameras disposed in all the directions even when a person or object is present only in a particular direction, thereby resulting in inefficient power consumption.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide to an electronic device and operation method thereof for recognizing an object in a vicinity of a vehicle and determining whether to switch an operating mode of a black box according to the recognized object.

Additional aspects will be set forth in part in the description which follows and, in part, will be apparent from the description, or may be learned by practice of the presented embodiments.

In accordance with an aspect of the disclosure, a method, performed by an electronic device, of controlling a black box mounted in a vehicle is provided. The operation method of the electronic device includes determining an operating mode of the black box to be a sleep mode in a state that an engine of the vehicle is turned off, transmitting, by using an ultra-wideband (UWB) communication module, an ultra-wideband (UWB) signal to an object located in a vicinity of the vehicle and receiving a UWB signal from the object, identifying, based on the received UWB signal, whether the object is a device of a driver of the vehicle, and determining, based on a result of the identifying of the object, whether to switch the operating mode of the black box from the sleep mode to an activation mode.

In accordance with another aspect of the disclosure, an electronic device mounted in a vehicle is provided. The electronic device includes a UWB communication module, a black box including at least one camera and configured to capture an image of an object in the vicinity of the vehicle using the at least one camera, memory storing at least one instruction, and at least one processor configured to execute the at least one instruction. The at least one processor may be configured to execute the at least one instruction to determine an operating mode of the black box to be a sleep mode in a state that an engine of the vehicle is turned off, control the UWB communication module to transmit a UWB signal to an object located in the vicinity of the vehicle and receive a UWB signal from the object, identify, based on the received UWB signal, whether the object is a device of a driver of the vehicle, and determine, based on a result of the identifying of the object, whether to switch the operating mode of the black box from the sleep mode to an activation mode.

In accordance with another aspect of the disclosure, one or more non-transitory computer-readable storage media is provided. The computer-readable storage media includes computer-executable instructions that, when executed by at least one processor of an electronic device, cause the electronic device to perform operations including determining an operating mode of a black box to be a sleep mode when an engine of a vehicle is turned off, transmitting, by using a UWB communication module, a UWB signal to an object located in the vicinity of the vehicle and receive a UWB signal from the object, identifying, based on the received UWB signal, whether the object is a device of a driver of the vehicle, and determining, based on a result of the identifying of the object, whether to switch the operating mode of the black box from the sleep mode to an activation mode.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings in which.

Throughout the drawings, it should be noted that like reference numbers are used to depict the same or similar elements, features, and structures.

MODE FOR INVENTION

Figure 1:
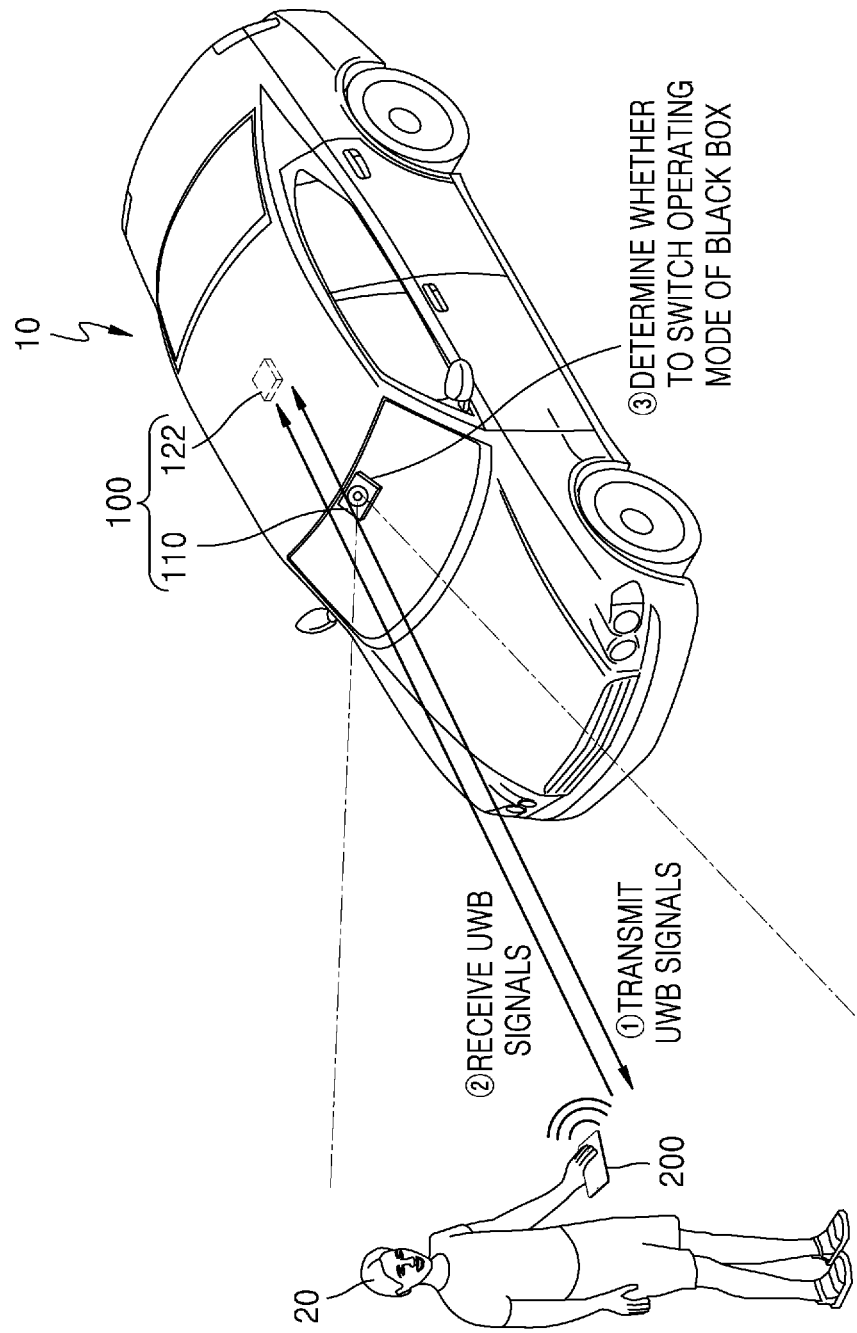
FIG. 1 is a conceptual diagram illustrating an operation in which an electronic device controls a black box mounted in a vehicle according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As the terms used herein, general terms that are currently widely used are selected by taking functions in an embodiment of the disclosure into account, but may be changed according to an intention of one of ordinary skill in the art, precedent cases, advent of new technologies, or the like. Furthermore, specific terms may be arbitrarily selected by the applicant, and in this case, the meaning of the selected terms will be described in the detailed description of a corresponding embodiment of the disclosure. Thus, the terms used herein should be defined not by simple appellations thereof but based on the meaning of the terms together with the overall description of the disclosure.

All the terms used herein, which include technical or scientific terms, may have the same meaning that is generally understood by a person of ordinary skill in the art of the disclosure.

Throughout the disclosure, when a part "includes" or "comprises" an element, unless there is a particular description contrary thereto, the part may further include other elements, not excluding the other elements. Furthermore, terms, such as "portion," "module," or the like, used herein indicate a unit for processing at least one function or operation, and may be embodied as hardware or software or a combination of hardware and software.

The expression "configured to (or set to)" used in an embodiment of the disclosure may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations, or a general-purpose processor (e.g., a central processing unit (CPU) or an application processor (AP)) capable of performing the corresponding operations by executing one or more software programs stored in memory.

Furthermore, in an embodiment of the disclosure, it should be understood that when a component is referred to as being "connected" or "coupled" to another component, the component may be directly connected or coupled to the other component, but may also be connected or coupled to the other component via another intervening component therebetween unless there is a particular description contrary thereto.

In an embodiment of the disclosure, a 'vehicle' is transportation equipment that travels on a road or track. The vehicle may be a concept that includes an internal combustion engine vehicle having an engine as a power source, a hybrid vehicle having an engine and an electric motor as a power source, an electric vehicle having an electric motor as a power source, or the like. In an embodiment of the disclosure, the vehicle may include at least one of an automobile, a train, or a motorcycle.

In an embodiment of the disclosure, a 'black box' is a type of drive video record system (DVRS) that obtains images of surroundings of the vehicle by photographing the vicinity around the vehicle when the vehicle is driving, parked, and/or stopped, and stores the obtained images. The black box may detect events that occur not only while the vehicle is driving but also while it is parked or stopped, such as damage to the vehicle due to a minor collision, a rear-end accident, or the like, or theft of items from the vehicle, and obtain images of the surroundings of the vehicle by photographing the vicinity around the vehicle in response to detecting the events.

In an embodiment of the disclosure, a 'sleep mode' refers to an operating mode in which the black box turns off a camera and thus does not capture images of the surroundings of the vehicle. In the sleep mode, minimal power may be applied to the black box.

In an embodiment of the disclosure, an 'activation mode' refers to an operating mode in which power is applied to a camera of the black box to switch the camera to an on-state, and images of the surroundings of the vehicle are obtained by photographing the vicinity around the vehicle via the camera.

In an embodiment of the disclosure, 'ultra-wideband (UWB) communication' refers to a communication method that uses an ultra-wideband frequency band between 3.1 gigahertz (GHz) and 10.6 GHz to transmit and receive data. UWB communication networks are capable of transmitting and receiving data at speeds of up to 500 megabits per second (Mbps).

An embodiment of the disclosure will be described more fully hereinafter with reference to the accompanying drawings so that the embodiment may be easily implemented by a person of ordinary skill in the art. However, the disclosure may be implemented in different forms and should not be construed as being limited to embodiments of the disclosure set forth herein.

Hereinafter, embodiments of the disclosure are described with reference to the accompanying drawings.

FIG. 1 is a conceptual diagram illustrating an operation in which an electronic device controls a black box mounted in a vehicle according to an embodiment of the disclosure.

Referring to FIG. 1, an electronic device 100 may include a black box 110 and a UWB communication module 122. Although FIG. 1 shows that the electronic device 100 includes only the black box 110 and the UWB communication module 122, but the electronic device 100 is not limited thereto. In an embodiment of the disclosure, the electronic device 100 may further include a processor (130 of FIG. 2) and memory (140 of FIG. 2).

The black box 110 is a type of drive video record system (DVRS) that obtains images of surroundings of the vehicle 10, which are captured when the vehicle 10 is driving, parked, and/or stopped, and stores the obtained images. The black box 110 may detect events that occur not only while the vehicle 10 is driving but also while it is parked or stopped, such as damage to the vehicle 10 due to a minor collision, a rear-end accident, or the like, or theft of items from the vehicle 10, and obtain images of the surroundings of the vehicle 10 by photographing the vicinity around the vehicle 10 in response to detecting the events. The black box 110 may operate in a sleep mode when the engine is turned off while the vehicle 10 is parked or stopped. A 'sleep mode' refers to an operating mode in which the black box 110 turns off its camera and thus does not capture images of the surroundings of the vehicle 10. In the sleep mode, minimal power may be applied to the black box 110.

The UWB communication module 122 is a hardware communication device configured to transmit and receive data by using a UWB frequency band between 3.1 GHz and 10.6 GHz. The UWB communication module 122 may transmit UWB signals to objects located in the vicinity of the vehicle 10 and receive UWB signals from the objects. In an embodiment of the disclosure, the UWB communication module 122 may perform functions and/or operations, such as those of a radar for monitoring the surroundings of the vehicle 10, by transmitting UWB scanning pulses to objects 20 and 200 in the vicinity of the vehicle 10 and detecting UWB impulse signals reflected or transmitted from the objects 20 and 200.

In the embodiment of the disclosure shown in FIG. 1, the electronic device 100 may control the UWB communication module 122 to transmit UWB signals to the objects 20 and 200 in the vicinity of the vehicle 10 (operation ①). Under the control of the electronic device 100, the UWB communication module 122 may transmit UWB scanning pulses to the objects 20 and 200 in the vicinity of the vehicle 10. In an embodiment of the disclosure, the objects 20 and 200 may respectively include a person and a mobile device. For example, the person that is the object 20 may be a driver of vehicle 10 or an outsider unrelated to the vehicle 10.

The electronic device 100 receives UWB signals from the objects 20 and 200 via the UWB communication module 122 (operation ②). In an embodiment of the disclosure, the UWB communication module 122 may detect UWB impulse signals reflected or received from the objects 20 and 200.

The electronic device 100 may determine, based on the received UWB signals, whether to switch an operating mode of the black box 110 (operation ③). In an embodiment of the disclosure, the person that is the object 20 may be a driver of the vehicle 10, and the mobile device, which is the object 200, carried by the person may be a device having a UWB communication function and transmit a UWB impulse signal to the UWB communication module 122. In an embodiment of the disclosure, the mobile device, i.e., the object 200, may include a digital key capable of controlling the vehicle 10, such as accessing, starting, operating, and/or controlling functions of the vehicle 10. For example, the mobile device may store an application that includes a digital key capable of controlling the vehicle 10. The electronic device 100 may identify a digital key based on the UWB impulse signal received from the mobile device 200, and identify that the mobile device 200 is a device of the driver of the vehicle 10. According to an identification result, the electronic device 100 may maintain the operating mode of the black box 110 in a sleep mode without switching the operating mode thereof. When the operating mode of the black box 110 is maintained in the sleep mode, the black box 110 does not apply power to a camera and not capture images of the objects 20 and 200 present in the vicinity of the vehicle 10.

In an embodiment of the disclosure, when the person that is the object 20 is an outsider unrelated to the driver of the vehicle 10, the electronic device 100 may detect a UWB scanning pulse reflected from the outsider via the UWB communication module 122, and detect the outsider based on the detected UWB scanning pulse. In an embodiment of the disclosure, the UWB communication module 122 may perform a radar-like function to obtain information about a location and a direction of the outsider by using a UWB scanning pulse reflected from the outsider. When the outsider is detected, the electronic device 100 may switch the operating mode of the black box 110 from the sleep mode to an activation mode. The 'activation mode' refers to an operating mode in which power is applied to a camera of the black box 110 to switch the camera to an on-state and images of the surroundings of the vehicle 10 are obtained by photographing the vicinity around the vehicle via the camera. The electronic device 100 may obtain an image by photographing an outsider using the black box 110 switched to the activation mode, and store the obtained image in internal memory.

In the related art, in order to reduce the power consumption of the black box 110, a method is used of waking up the black box 110 only when a radar mounted on the vehicle 10 detects the approach of a person or object in an area within a certain distance around the vehicle 10. When the method of the related art is used, it is not possible to recognize who is approaching the vehicle 10 or in which direction an object or another vehicle is approaching. As a result, the black box 110 is operated even when the driver of the vehicle 10 approaches the vehicle 10, which causes unnecessary power consumption.

The disclosure aims to provide the electronic device 100 and operation method therefor for identifying the objects 20 and 200 located in the vicinity of the vehicle 10 by using UWB signals and controlling an operating mode of the black box 110 based on an identification result.

According to an embodiment of the disclosure, the electronic device 100 transmits UWB signals to the objects 20 and 200 in the vicinity of the vehicle 10 via the UWB communication module 122, identifies the objects 20 and 200 based on UWB signals reflected or received from the objects 20 and 200, and maintains an operating mode of the black box 110 in a sleep mode when the identified objects 20 and 200 are the driver of the vehicle 10, thereby providing technical effects of preventing unnecessary power consumption and improving power efficiency. In addition, according to an embodiment of the disclosure, the electronic device 100 may utilize a digital key system using UWB signals to identify the driver of the vehicle 10, thereby preventing theft of the vehicle 10, theft of items from the vehicle 10, and/or damage to the vehicle 10, and enhancing a security function of the vehicle 10.

Figure 2:
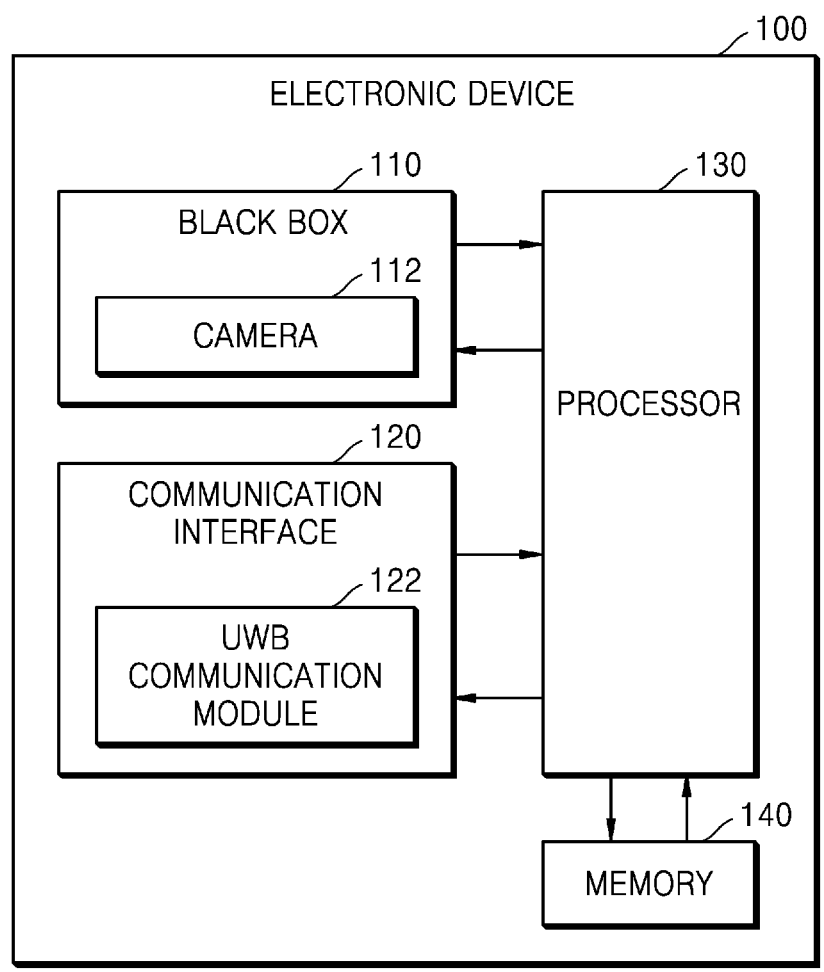
FIG. 2 is a block diagram illustrating components of an electronic device according to an embodiment of the disclosure.

FIG. 2 is a block diagram illustrating components of an electronic device 100 according to an embodiment of the disclosure.

Referring to FIG. 2, the electronic device 100 may include a black box 110, a communication interface 120, the processor 130, and the memory 140. The black box 110, the communication interface 120, the processor 130, and the memory 140 may be electrically and/or physically coupled to each other. FIG. 2 shows only essential components for describing an operation of the electronic device 100, and the components included in the electronic device 100 are not limited to those shown in FIG. 2. In an embodiment of the disclosure, the electronic device 100 may further include a power supply (e.g., a battery) configured to supply driving power to the black box 110, the communication interface 120, and the processor 130.

The black box 110 is a device that obtains images of the surroundings of a vehicle, which are captured when the vehicle is driving, parked, and/or stopped, and stores the obtained images. The black box 110 may detect events that occur not only while the vehicle is driving but also while it is parked or stopped, such as damage to the vehicle due to a minor collision, a rear-end accident, or the like, or theft of items from the vehicle, and obtain images of the surroundings of the vehicle by photographing the vicinity around the vehicle in response to detecting the events. The black box 110 may include a camera 112.

The camera 112 is configured to obtain images of objects in the vicinity of the vehicle by photographing the objects. In an embodiment of the disclosure, the camera 112 may include a lens module, an image sensor, and an image processing module. The camera 112 may obtain a still image or video of an object via an image sensor (e.g., a complementary metal-oxide-semiconductor (CMOS) or charge-coupled device (CCD) sensor). The image processing module may encode a still image consisting of a single image frame or video data consisting of a plurality of image frames, which are obtained via the image sensor, and transmit the encoded data to the processor 130.

The camera 112 may be configured as one or a plurality of cameras. When the camera 112 is configured as a plurality of cameras, the plurality of cameras may be disposed on front, left and right sides, and rear of the vehicle. A structure of arrangement of the plurality of cameras 112 is described with reference to FIG. 8A.

The communication interface 120 is a hardware device configured to perform data communication with a base station, a server, or other devices in the vicinity of the vehicle via a wireless communication network. The communication interface 120 may include a UWB communication module 122.

The UWB communication module 122 is a hardware communication device configured to transmit and receive data by using a UWB frequency band between 3.1 GHz and 10.6 GHz. The UWB communication module 122 is capable of transmitting and receiving data at speeds of up to 500 Mbps. The UWB communication module 122 may transmit a UWB signal to an object in the vicinity of the vehicle and receive a UWB signal from the object. In an embodiment of the disclosure, the UWB communication module 122 may include a UWB radar and a UWB antenna element.

The UWB radar consists of a communication device that emits radio waves at a UWB frequency toward an object and receives reflected waves from the object to thereby determine and detect the presence, location, distance, speed, or status of the object. In an embodiment of the disclosure, the UWB radar may transmit a UWB impulse signal to an object in the vicinity of the vehicle and receive a reflected signal reflected from the object. The UWB radar may provide the received reflected signal to the processor 130. In an embodiment of the disclosure, the UWB radar may detect a UWB scanning pulse transmitted by a device having a UWB communication function among objects in the vicinity of the vehicle.

The UWB antenna element is an antenna that transmits a UWB signal component to the outside or receives a UWB signal from the outside. The UWB antenna element may include a transmitting antenna and a receiving antenna. The transmitting antenna may transmit UWB signal components to objects or external devices around the vehicle. In an embodiment of the disclosure, the transmitting antenna includes a plurality of antenna elements, and the plurality of antenna elements may be each configured as a patch antenna. However, the transmitting antenna is not limited thereto.

When an external device is able to receive a UWB signal, the UWB antenna element may transmit a ranging request message (poll message) via the transmitting antenna, and receive a response message received from the external device in response to the poll message. The processor 130 may obtain location information about the external device by using a time of arrival (TOA) or time difference of arrival (TDOA) method that uses a time difference between the ranging request message and the response message. In an embodiment of the disclosure, the processor 130 may obtain ranging information which is information about a relative distance between the electronic device 100 and the external device, and angle of arrival (AOA) information which is direction information about the external device. A specific embodiment in which the UWB communication module 122 obtains information about a location and a direction of an external device by using a UWB antenna element is described with reference to FIG. 7.

Although not shown FIG. 2, the communication interface 120 may further include a hardware communication device that perform data communication with a base station, a server, or other devices in the vicinity of the vehicle by using other known communication methods, e.g., short-range wireless data communication, such as wireless fidelity (Wi-Fi), wireless broadband (Wibro), world interoperability for microwave access (Wimax), wi-fi direct (WFD), radio frequency identification (RFID), infrared data association (IrDA), ZigBee, near-field communication (NFC), or Bluetooth™, as well as a mobile communication network using code division multiple access (CDMA), wide-band CDMA (WCDMA), $3^{rd}$ generation (3G), and/or $4^{th}$ generation (4G) long-term evolution (LTE).

The processor 130 may execute one or more instructions of a program stored in the memory 140. The processor 130 may include hardware components that perform arithmetic, logic, and input/output (I/O) operations, and image processing. In FIG. 2, the processor 130 is shown as a single element, but it is not limited thereto. In an embodiment of the disclosure, the processor 130 may include one or a plurality of elements. The processor 130 may be a general-purpose processor, such as a CPU, an AP, a digital signal processor (DSP), or the like, a dedicated graphics processor, such as a graphics processing unit (GPU), a vision processing unit (VPU), or the like, or a dedicated artificial intelligence (AI) processor, such as a neural processing unit (NPU). When the processor 130 is a dedicated AI processor, the dedicated AI processor may be designed with a hardware structure specialized for processing a particular AI model.

The memory 140 may include at least one type of storage medium, i.e., at least one of flash memory-type memory, hard disk-type memory, multimedia card micro-type memory, card-type memory (e.g., a secure digital (SD) card or extreme digital (XD) memory), random access memory (RAM), static RAM (SRAM), read-only memory (ROM), electrically erasable programmable ROM (EEPROM), PROM, magnetic memory, a magnetic disc, or an optical disc.

The memory 140 may store instructions related to functions and/or operations performed by the electronic device 100 to control the black box 110. In an embodiment of the disclosure, the memory 140 may store at least one of instructions, algorithms, data structures, program code, or application programs readable by the processor 122. The instructions, algorithms, data structures, and program code stored in memory 140 may be implemented in programming or scripting languages, such as C, C++, Java, assembler, or the like.

Functions or operations performed by the processor 130 by executing instructions or program code included in modules stored in the memory 140 are described.

The processor 130 may receive a UWB signal from an object via the UWB communication module 122 and identify whether the object is a vehicle driver's device based on the received UWB signal. In an embodiment of the disclosure, the UWB communication module 122 may detect a UWB signal reflected or received from the object. In an embodiment of the disclosure, when the object located in the vicinity of the vehicle is a vehicle driver's device and the device has a UWB communication function, the processor 130 may receive a UWB impulse signal from the vehicle driver's device via the UWB communication module 122. The vehicle driver's device may include a preregistered digital key capable of controlling the vehicle, e.g., accessing, starting, operating, and/or controlling functions of the vehicle. For example, the vehicle driver's device may store an application that includes a digital key capable of controlling the vehicle. The processor 130 may obtain identification information about a digital key based on the UWB impulse signal received from the vehicle driver's device, and identify, based on the identification information about the digital key, a device preregistered as the vehicle driver.

In an embodiment of the disclosure, the processor 130 may identify, via the UWB communication module 122, an unregistered outsider or unregistered object that is not related to the vehicle driver among objects in the vicinity of the vehicle. The processor 130 may control the UWB communication module 122 to transmit a UWB scanning pulse to an unregistered outsider or unregistered object in the vicinity of the vehicle and detect a UWB scanning pulse reflected from the unregistered outsider or unregistered object, thereby identifying the unregistered outsider or unregistered object.

The processor 130 may determine whether to switch the operating mode of the black box 110 based on a result of the identification of the object. When the vehicle is parked or stopped so the engine is turned off, the black box 110 may operate in a sleep mode. The 'sleep mode' refers to an operating mode in which the black box 110 turns off the camera and does not capture images of the surroundings of the vehicle. In an embodiment of the disclosure, when an object in the vicinity of the vehicle is identified as being a vehicle driver's device, the processor 130 may maintain the operating mode of the black box 110 in a sleep mode without switching the operating mode thereof. In the sleep mode, minimal power may be applied to the black box 110. In an embodiment of the disclosure, when an object in the vicinity of the vehicle is identified as being an unregistered outsider or unregistered object that is not related to the driver, the processor 130 may switch the operating mode of the black box 110 from the sleep mode to an activation mode.

When switching the operating mode of the black box 110 to the activation mode, the processor 130 may apply driving power to the camera 112 included in the black box 110 to switch the camera 112 to an on-state and obtain an image of the surroundings of the vehicle by photographing the unregistered outsider or unregistered object via the camera 112.

The processor 130 may store the image obtained via the camera 112 in a storage space within the memory 140.

When, in response to an unregistered outsider or an unregistered object being identified, an operating mode of the black box 110 is switched and the camera 112 is used to start capturing images of objects in the vicinity of the vehicle, the processor 130 may generate a notification message that notifies the driver about information about the switching of the operating mode and the start of the capturing, and control the communication interface 120 to transmit the notification message to the driver's device. A specific embodiment in which the processor 130 transmits a notification message to the driver's device is described with reference to FIG. 5.

In an embodiment of the disclosure, the black box 110 may include the plurality of cameras 112 disposed at different locations on the vehicle, and the processor 130 may obtain an image of the vehicle's surroundings by photographing an object (an unregistered outsider or unregistered object) with only a camera disposed closest to a location and a direction of the object, which is obtained based on a UWB signal reflected from the object. Specific embodiments in which the processor 130 obtains an image of the vehicle's surroundings by photographing an object with only some of the plurality of cameras 112 are described with reference to FIGS. 6, 7, 8A, and 8B.

In an embodiment of the disclosure, the processor 130 may receive UWB signals via the UWB communication module 122 over time and track a location and a direction of an object based on the received UWB signals. In an embodiment of the disclosure, the processor 130 may identify a path of movement of the object by tracking the location and direction of the object obtained over time. The processor 130 may determine whether to switch the operating mode of the black box 110 based on the path of movement of the object. When, as a result of tracking, the location of the object is outside an area within a preset range from the vehicle, the processor 130 may capture an image of the object by maintaining the operating mode of the black box 110 in an activation mode for a predetermined time. The processor 130 may switch the operating mode of the black box 110 to a sleep mode after the predetermined time has elapsed. A specific embodiment in which the processor 130 switches the operating mode of the black box 110 according to the result of tracking the location of an object is described with reference to FIG. 9.

In an embodiment of the disclosure, device identification information about an authenticated user having authority to operate or control the vehicle in addition to the driver of the vehicle may be preregistered in the memory 140. The memory 140 may store a digital key including device identification information about an authenticated user, such as a person having a special relationship with the driver of the vehicle, e.g., a family member, such as a parent or younger sibling, or a coworker or friend. The processor 130 may obtain device identification information from a UWB signal received via the UWB communication module 122, and identify an authenticated user based on the obtained device identification information. When identifying the authenticated user, the processor 130 may maintain the operating mode of the black box 110 in a sleep mode. Specific embodiments in which the processor 130 identifies an authenticated user other than the vehicle driver and maintains the operating mode of the black box 110 in the sleep mode is described with reference to FIGS. 10 and 11.

Figure 3:
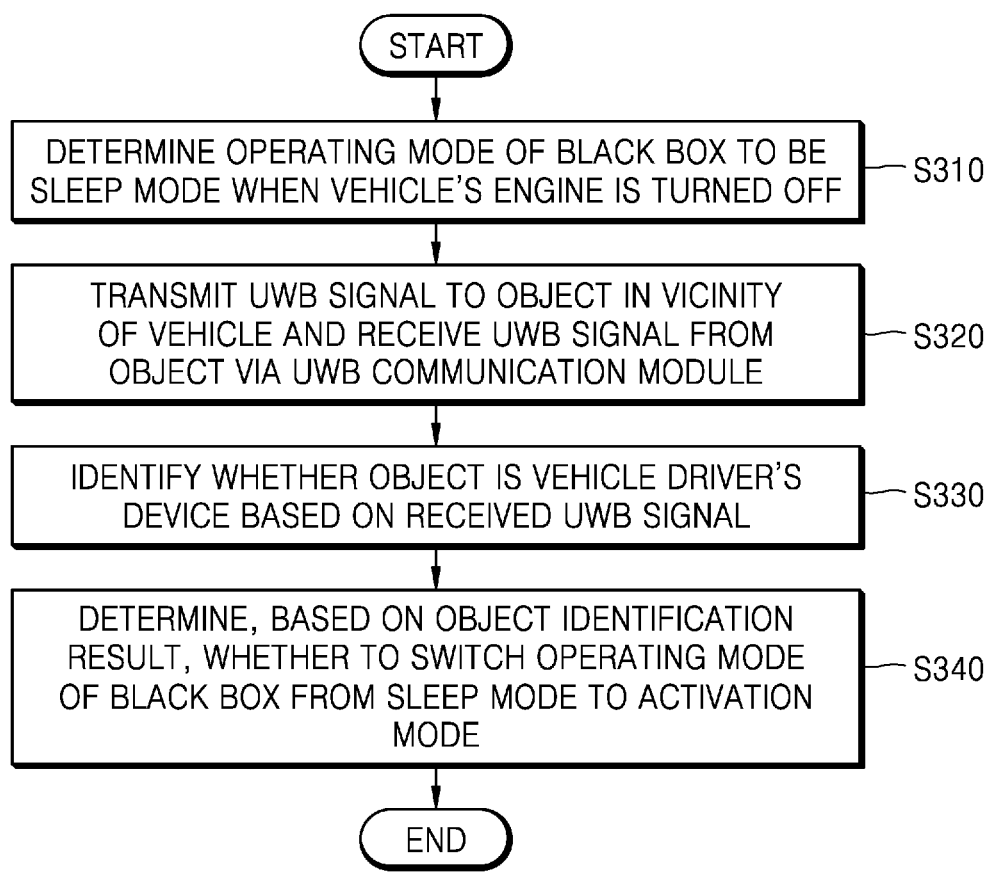
FIG. 3 is a flowchart of a method, performed by an electronic device, of controlling an operation of a black box mounted in a vehicle according to an embodiment of the disclosure.

FIG. 3 is a flowchart of a method, performed by an electronic device of controlling an operation of a black box mounted in a vehicle according to an embodiment of the disclosure.

Referring to FIG. 3, in operation S310, the electronic device 100 determines an operating mode of a black box to be a sleep mode when a vehicle's engine is turned off. The electronic device 100 may identify the vehicle as parked based on the vehicle's engine being turned off. The electronic device 100 may identify whether the vehicle is temporarily stopped (or temporarily parked) or parked for a predetermined time. For example, the electronic device 100 may identify the vehicle as parked when a predetermined time has elapsed since the vehicle's engine was turned off. In response to identifying the parking or stopping of the vehicle, the electronic device 100 may determine the operating mode of the black box to be a sleep mode so as to detect vehicle security-related events (e.g., damage to the vehicle due to a minor collision while the vehicle is parked or stopped, a rear-end accident, or the like, or theft of items from the vehicle). The 'sleep mode' refers to an operating mode in which the black box turns off the camera and thus does not capture images of the surroundings of the vehicle. In the sleep mode, minimal power may be applied to the black box.

In operation S320, the electronic device 100 uses a UWB communication module to transmit a UWB signal to an object in the vicinity of the vehicle and receive a UWB signal from the object. The UWB communication module is a hardware communication device configured to transmit and receive data by using a UWB frequency band between 3.1 GHz and 10.6 GHz. The electronic device 100 may control the UWB communication module to transmit a UWB signal to an object in the vicinity of the vehicle and receive a UWB signal from the object. In an embodiment of the disclosure, by transmitting a UWB scanning pulse to an object in the vicinity of the vehicle and detecting a UWB impulse signal reflected or transmitted from the object via the UWB communication module, the electronic device 100 may perform functions and/or operations, such as those of a radar for monitoring the surroundings of the vehicle.

In operation S330, the electronic device 100 identifies whether the object is a vehicle driver's device based on the received UWB signal. The electronic device 100 may detect, via the UWB communication module, a UWB signal reflected or received from the object. In an embodiment of the disclosure, when the object located in the vicinity of the vehicle is a vehicle driver's device and the device has a UWB communication function, the electronic device 100 may receive a UWB impulse signal from the vehicle driver's device via the UWB communication module. The vehicle driver's device may include a preregistered digital key capable of controlling the vehicle, e.g., accessing, starting, operating, and/or controlling functions of the vehicle. For example, the vehicle driver's device may store an application that includes a digital key capable of controlling the vehicle. The electronic device 100 may obtain identification information about the digital key based on the UWB impulse signal received from the vehicle driver's device, and identify, based on the identification information about the digital key, a device preregistered as the vehicle driver.

In an embodiment of the disclosure, the electronic device 100 may identify, via the UWB communication module, an unregistered outsider or unregistered object that is not related to the vehicle driver among objects in the vicinity of the vehicle. The electronic device 100 may transmit, via the UWB communication module, a UWB scanning pulse to an unregistered outsider or unregistered object in the vicinity of the vehicle and detect, via the UWB communication module, a UWB scanning pulse reflected from the unregistered outsider or unregistered object, thereby identifying the unregistered outsider or unregistered object.

In operation 8340, the electronic device 100 determines, based on a result of the identification of the object, whether to switch the operating mode of the black box from the sleep mode to an activation mode. Based on whether the identified object is the vehicle driver's device, the electronic device 100 may determine whether to switch the operating mode of the black box from the sleep mode to an activation mode. Operation 8340 is described with reference to FIG. 4.

Figure 4:
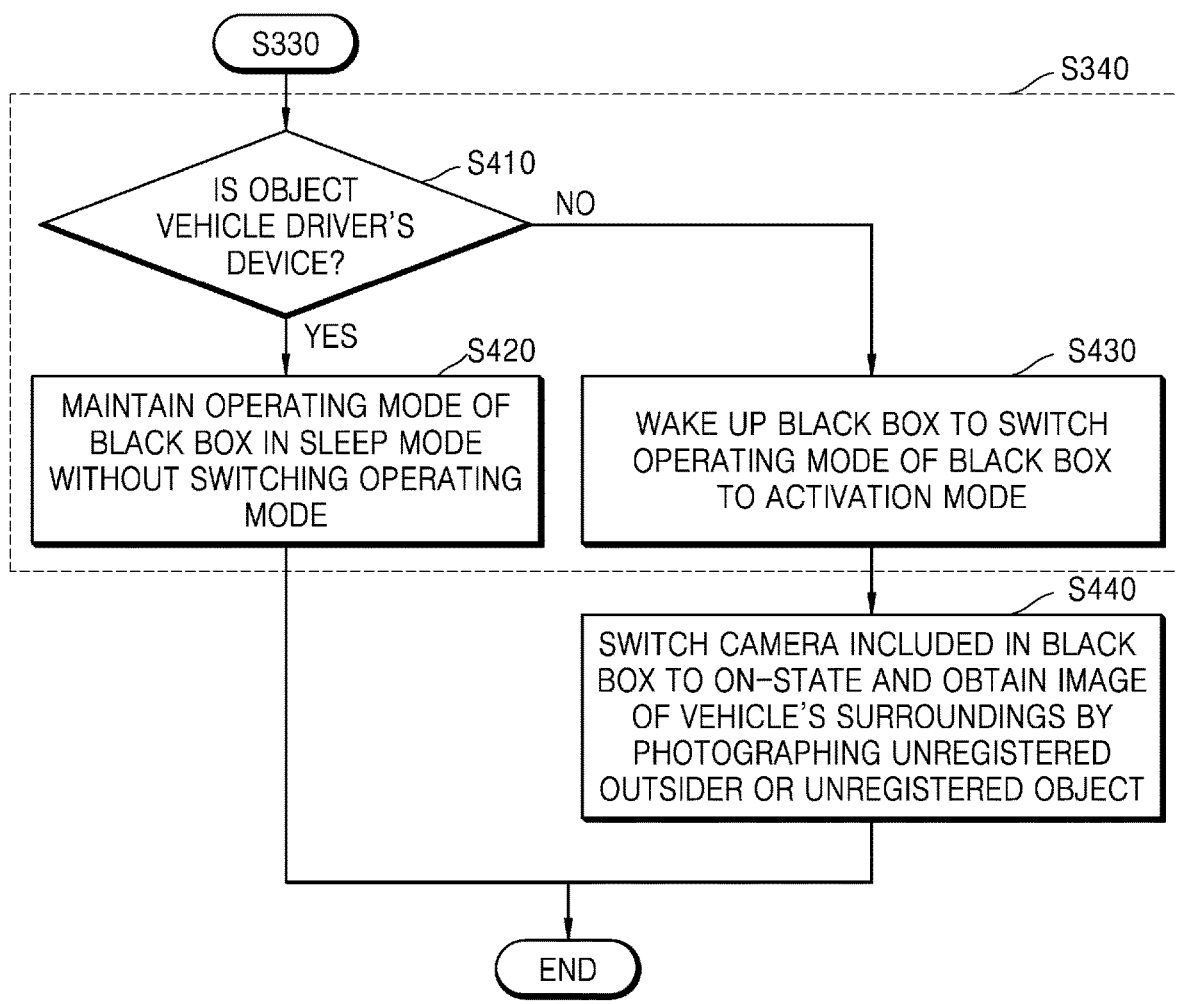
FIG. 4 is a flowchart of a method, performed by an electronic device, of determining, based on an object identification result, whether to switch an operating mode of a black box, according to an embodiment of the disclosure.

FIG. 4 is a flowchart of a method, performed by an electronic device of determining whether to switch an operating mode of a black box based on a result of identification of an object according to an embodiment of the disclosure.

Referring to FIG. 4, operations 8410 to 8430 shown in FIG. 4 are detailed operations of operation 8340 of FIG. 3. Operation 8410 shown in FIG. 4 may be performed after operation 8330 of FIG. 3 is performed.

In operation 8410, the electronic device 100 identifies whether the object is a vehicle driver's device. As described with reference to FIG. 3, the electronic device 100 may obtain a digital key based on a UWB impulse signal received from the object, and identify whether the object is the vehicle driver's device by comparing the preregistered digital key of the vehicle driver with the digital key obtained from the UWB impulse signal.

When identifying the object as being the vehicle driver's device (operation S420), the electronic device 100 does not switch the operating mode of the black box but maintains it in the sleep mode. In the sleep mode, only minimal driving power is supplied to the black box, and the camera of the black box remains off and does not capture images of the surroundings of the vehicle.

When identifying the object as being an unregistered outsider or an unregistered object that is not the vehicle driver's device (operation S430), the electronic device 100 wakes up the black box to switch the operating mode of the black box to an activation mode.

In operation S440, the electronic device 100 switches the camera included in the black box to an on-state and obtains an image of the surroundings of the vehicle by photographing the unregistered outsider or unregistered object via the camera. In an embodiment of the disclosure, the electronic device 100 may store the obtained image of the surroundings of the vehicle in a storage space within the memory (140 of FIG. 2).

Figure 5:
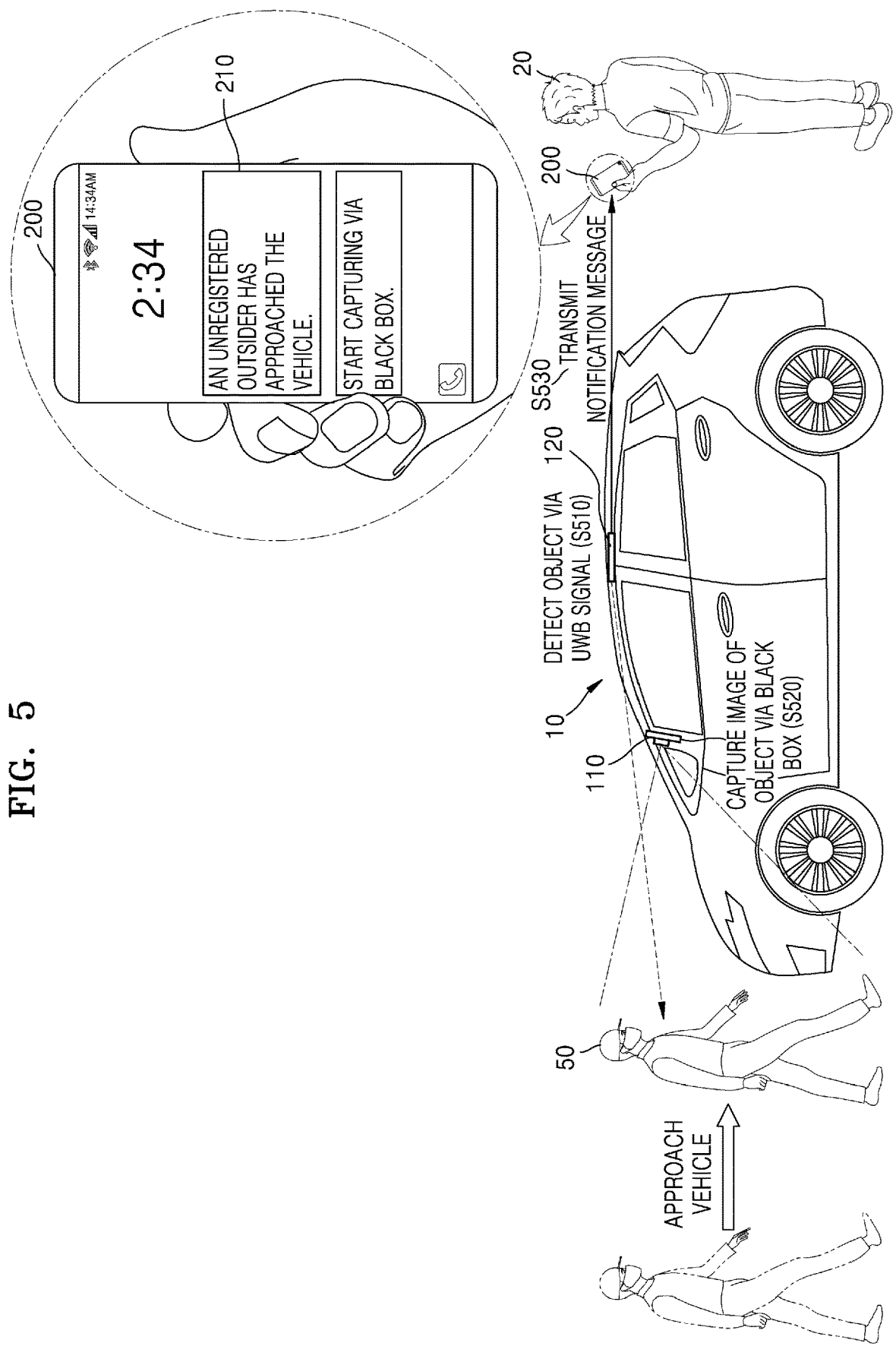
FIG. 5 is a diagram illustrating an operation in which an electronic device provides a user with information about switching of an operating mode of a black box and start of capturing, according to an embodiment of the disclosure.

FIG. 5 is a diagram illustrating an operation in which an electronic device provides a user with information about switching of an operating mode of a black box and start of capturing according to an embodiment of the disclosure.

Referring to FIG. 5, the electronic device 100 may transmit a UWB scanning pulse to an object 50 in the vicinity of a vehicle 10 via the UWB communication module (122 of FIG. 2) included in the communication interface 120, and detect a UWB scanning pulse reflected from the object 50.

In operation S510, the electronic device 100 detects the object 50 via a UWB signal reflected from the object. In the embodiment of the disclosure shown in FIG. 5, the object 50 is an outsider unrelated to a driver 20 of the vehicle 10 and may approach from the surroundings of the vehicle 10 in a direction toward the vehicle 10. The processor (130 of FIG. 2) of the electronic device 100 may identify a path of movement of the object 50 by detecting UWB signals reflected from the object 50 over time via the UWB communication module 122 and tracking a location and a direction of the object 50 based on the detected UWB signals. By tracking the location and direction of the object 50, the processor 130 may determine whether the object 50 is approaching an area within a preset range of a surrounding area for the vehicle 10.

In operation S520, the electronic device 100 captures an image of an object via the black box 110. In response to identifying the object 50 as an outsider and identifying the object 50 as approaching, the region within the preset range around the vehicle 10, the processor 130 of the electronic device 100 may switch an operating mode of the black box 110 from a sleep mode to an activation mode. In response to switching the operating mode of the black box 110 to the activation mode, the processor 130 may switch the camera included in the black box 110 to an on-state. The processor 130 may obtain an image of the surroundings of the vehicle 10 by photographing the object 50 in the vicinity of the vehicle 10 via the camera switched to the on-state.

In operation S530, the electronic device 100 transmits a notification message 210 to a device 200 of the driver 20 of the vehicle 10. The processor 130 of the electronic device 100 may generate the notification message 210 that notifies the driver 20 about information about the switching of the operating mode of the black box 110 and start of the photographing. For example, the notification message 210 may include text and/or an icon that includes, for example, a message "An unregistered outsider has approached the vehicle." or "Start capturing via the black box." The processor 130 may control the communication interface 120 to transmit the notification message 210 to the device 200 of the driver 20. The communication interface 120 may further include a hardware communication device that perform data communication with a base station, a server, or other devices in the vicinity of the vehicle by using not only short-range wireless data communication, such as Wi-Fi, Wibro, Wimax, WFD, RFID, IrDA, ZigBee, NFC, or Bluetooth™, but also a mobile communication network using CDMA, WCDMA, 3G, and/or 4G LTE.

The device 200 of the driver 20 may display the notification message 210 received from the electronic device 100 mounted in the vehicle 10.

When the driver 20 parks the vehicle, for example, on an unfamiliar roadside, in a random place, and/or in an outdoor parking lot, rather than in a regularly frequented area or parking lot, the driver 20 may feel anxious about security issues, such as the vehicle being damaged or stolen, or items inside the vehicle being stolen. In the embodiment of the disclosure shown in FIG. 5, the electronic device 100 may transmit the notification message 210 to the device 200 of the driver 20 when an unregistered outsider or unregistered object approaches the vicinity of the vehicle 10, thereby reducing the driver's anxiety about vehicle security issues when the driver 20 parks or stops the vehicle 10 in an unfamiliar place and moves away from the place.

Figure 6:
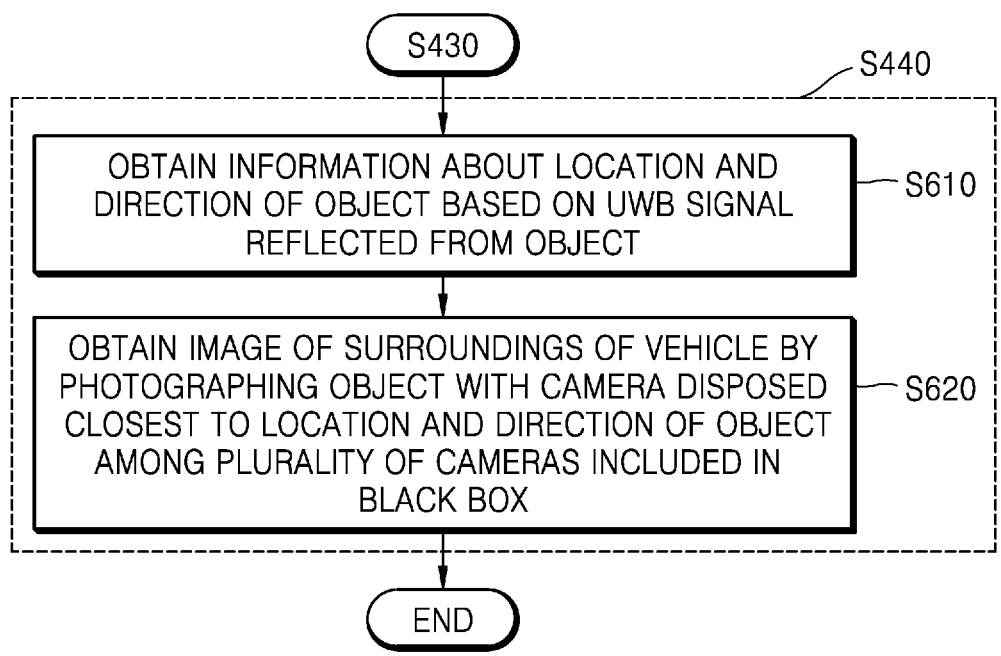
FIG. 6 is a flowchart of a method, performed by an electronic device, of capturing images of surroundings of a vehicle by using only some of a plurality of cameras included in a black box, according to an embodiment of the disclosure.

FIG. 6 is a flowchart of a method, performed by an electronic device of capturing images of surroundings of a vehicle by using only some of a plurality of cameras included in a black box according to an embodiment of the disclosure.

Referring to FIG. 6, operations S610 and S620 are detailed operations of operation S440 of FIG. 4. Operation S610 shown in FIG. 6 may be performed after operation S430 of FIG. 4 is performed.

In operation 8610, the electronic device 100 obtains information about a location and a direction of the object based on UWB signals reflected from the object. In an embodiment of the disclosure, the electronic device 100 may obtain ranging information and angle of arrival (AOA) information from the UWB signals reflected from the object. A specific method in which the electronic device 100 obtains ranging information and AOA information from UWB signals is described with reference to FIG. 7.

Figure 7:
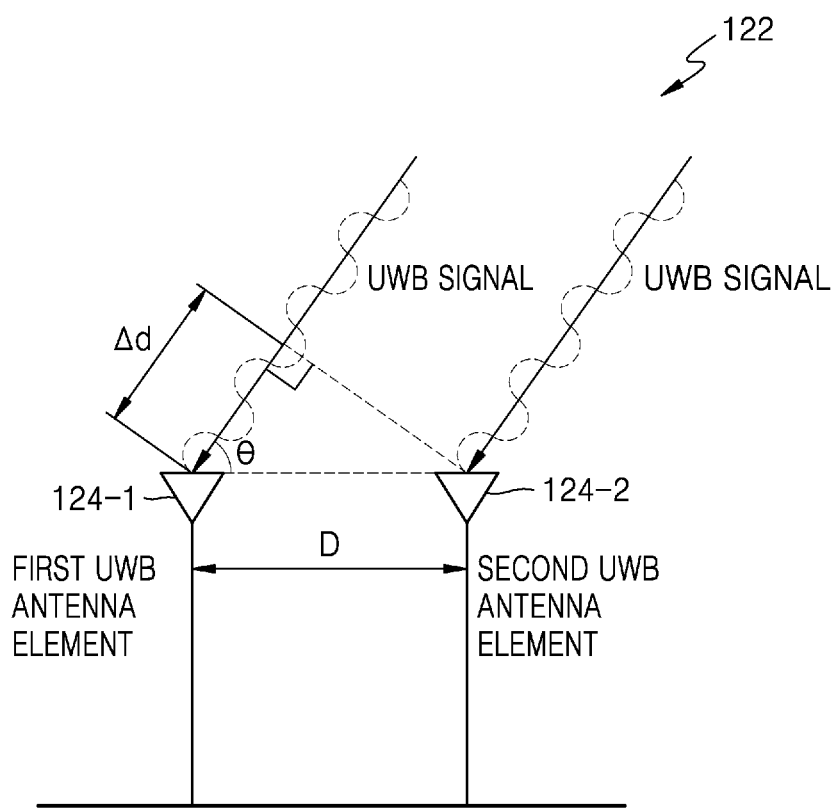
FIG. 7 is a diagram illustrating an operation in which an electronic device obtains information about a location and a direction of an object by using ultra-wideband (UWB) signals received via a plurality of antenna elements, according to an embodiment of the disclosure.

FIG. 7 is a diagram illustrating an operation in which an electronic device obtains information about a location and a direction of an object by using UWB signals received via a plurality of antenna elements according to an embodiment of the disclosure.

Referring to FIG. 7, the UWB communication module 122 may include the first antenna element 124-1 and the second antenna element 124-2. The first antenna element 124-1 and the second antenna element 124-2 may be configured as patch antennas, but are not limited thereto. Although FIG. 7 shows that the UWB communication module 122 includes two antenna elements, the number of antenna elements included in the UWB communication module 122 is not limited to that shown.

Referring to FIG. 7 in conjunction with operation 8610 of FIG. 6, the electronic device 1000 may obtain location information about the object by performing ranging using a two-way ranging (TWR) method. The processor (130 of FIG. 2) of the electronic device 100 may perform ranging operations by using, for example, either single-sided TWR (SS-TWR) or double-sided TWR (DS-TWR). In an embodiment of the disclosure, the processor 130 may transmit a ranging request message (poll message) to the object via the UWB communication module 122 and receive a message (e.g., a response message) returned from the object via the first antenna element 124-1 and the second antenna element 124-2. The processor 130 may obtain the location information about the object by using a TOA or TDOA method that uses a time difference between the poll message and the response message returned from the object.

The processor 130 of the electronic device 100 may obtain AOA information, which is direction information about the object, based on UWB signals received via the plurality of antenna elements, i. e., the first antenna element 124-1 and the second antenna element 124-2. In an embodiment of the disclosure, information about a length D between the first antenna element 124-1 and the second antenna element 124-2 may be stored in the memory (140 of FIG. 2) of the electronic device 100. The processor 130 may calculate an arrival distance Δd between the object and the electronic device 100 by using a difference in times at which the same UWB signals are received via the first antenna element 124-1 and the second antenna element 124-2, respectively. In an embodiment of the disclosure, the processor 130 may calculate the arrival distance Δd between the object and the electronic device 100 based on Equation 1 below.

$$D = \Delta d \cdot \cos\theta \qquad \text{Equation 1}$$

In an embodiment of the disclosure, the processor 130 may calculate a phase difference Δϕ between UWB signals respectively received from the first antenna element 124-1 and the second antenna element 124-2 according to Equation 2 below.

$$\Delta\varphi = \frac{2\pi}{\lambda} \cdot \Delta d \qquad \text{Equation 2}$$

The processor 130 may obtain AOA information representing a direction of the object, based on the arrival distance Δd calculated using Equation 1 and the phase difference Δϕ calculated using Equation 2. In an embodiment of the disclosure, the processor 130 may calculate an AOA value of the object according to Equation 3 below.

$$AOA(\theta) = \cos^{-1}\frac{\Delta\varphi}{2\pi D/\lambda} \qquad \text{Equation 3}$$

Referring back to FIG. 6, in operation 8620, the electronic device 100 obtains an image of the surroundings of the vehicle by photographing the object by using a camera disposed closest to the location and direction of the object among a plurality of cameras included in the black box. In an embodiment of the disclosure, the black box may include the plurality of cameras. Hereinafter, operation S620 is described with reference to FIGS. 8A and 8B.

Figure 8A:
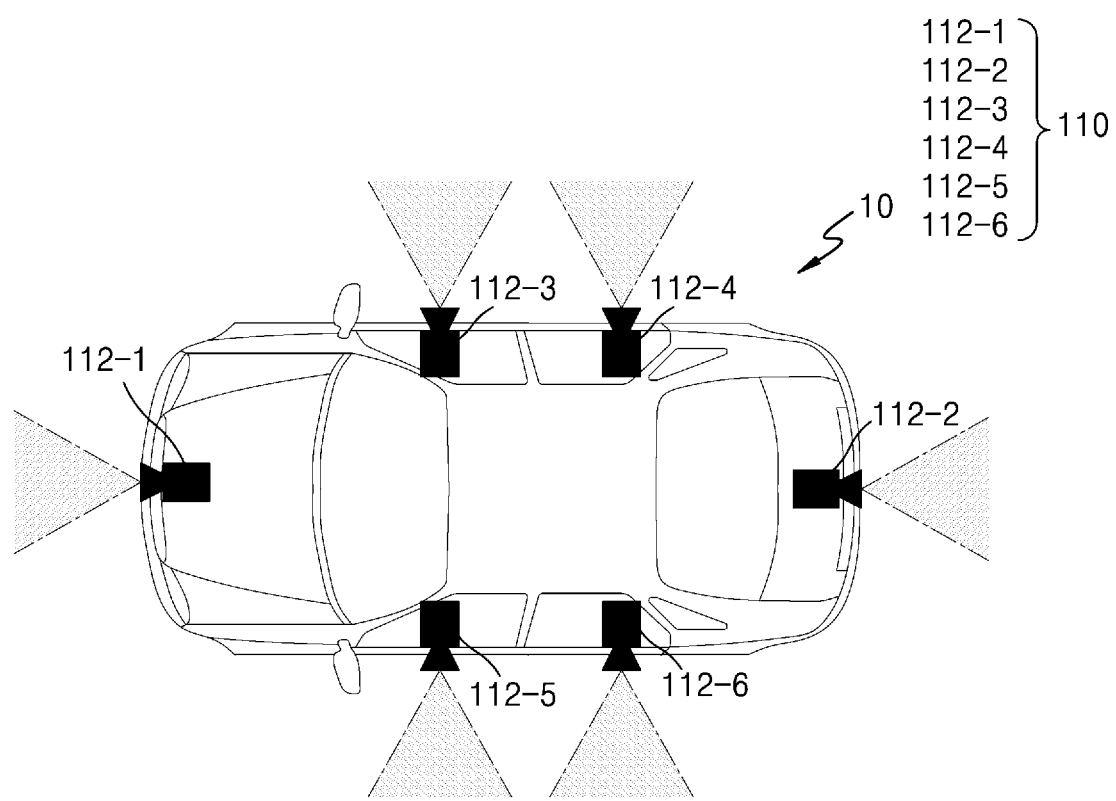
FIG. 8A illustrates a plurality of cameras included in a black box according to an embodiment of the disclosure.

FIG. 8A illustrates a plurality of cameras included in a black box according to an embodiment of the disclosure.

Referring to FIG. 8A, the plurality of cameras, i.e. first to sixth cameras 112-1 to 112-6, may be mounted on front, rear, left side, and right side of the vehicle 10. For example, the first camera 112-1 may be disposed on a front bumper or front windshield of the vehicle 10, and the second camera 112-2 may be disposed on a rear trunk of the vehicle 10. The third camera 112-3 and the fifth camera 112-5 may be respectively disposed adjacent to A-pillars on the right and left sides of the vehicle 10, and the fourth camera 112-4 and the sixth camera 112-6 may be respectively disposed adjacent to C-pillars on the right and left sides of the vehicle 10. The locations and number (6) of the plurality of cameras, i.e., the first to sixth cameras 112-1 to 112-6, and an embodiment of the disclosure is not limited to that shown in FIG. 8A.

Each of the plurality of cameras 112-1 to 112-6 may obtain images of objects by photographing the objects in the vicinity of the vehicle 10. For example, the first camera 112-1 may capture an image of an object located in front of the vehicle 10, the second camera 112-2 may capture an image of an object located at the rear of the vehicle 10, and the third to sixth cameras 112-3 to 112-6 may capture images of objects located in the left and right directions of the vehicle 10.

Figure 8B:
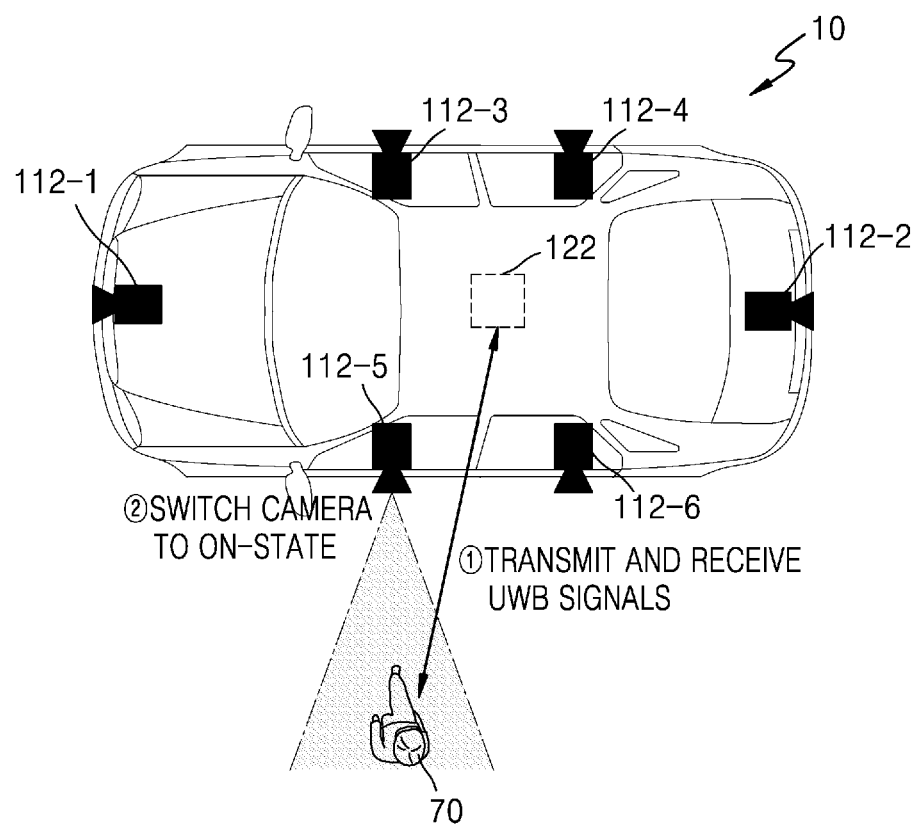
FIG. 8B illustrates an operation in which an electronic device captures images of surroundings of a vehicle by using only some of a plurality of cameras included in a black box according to an embodiment of the disclosure.

FIG. 8B is a diagram illustrating an operation in which an electronic device captures images of surroundings of a vehicle by using only some of a plurality of cameras included in a black box according to an embodiment of the disclosure.

Referring to FIG. 8B, the electronic device 100 may determine an operating mode of the black box 110 to be a sleep mode when an engine of the vehicle 10 is turned off, and maintain the plurality of cameras, i.e., the first to sixth cameras 112-1 to 112-6, included in the black box 110 in an off state. When the black box 110 is in the sleep mode, no driving power is applied to the first to sixth cameras 112-1 to 112-6, and the first to sixth cameras 112-1 to 112-6 do not capture images of the surroundings of the vehicle 10.

The processor (130 of FIG. 2) of the electronic device 100 may control the UWB communication module 122 to transmit a UWB signal to an object 70 in the vicinity of the vehicle 10 and detect a UWB signal reflected from the object 70. The processor 130 may identify whether the object 70 is a preregistered driver of the vehicle 10 based on the detected UWB signal. In the embodiment of the disclosure shown in FIG. 8B, the object 70 may be an outsider unrelated to the vehicle 10 and who does not have a digital key capable of controlling the vehicle 10, such as accessing, starting, operating, and/or controlling functions of the vehicle 10. The processor 130 may identify an outsider based on the UWB signal and obtain information about a location and a direction of the outsider. Because a specific method, performed by the processor 130, of obtaining information about the location and direction of the object 70 that is the outsider is substantially the same as that described in operation S610 of FIG. 6, a description thereof already provided above will be omitted here.

Based on the information about the location and direction of the object 70 identified as being an outsider, the processor 130 may switch a camera closest to the location of the object 70 among the plurality of cameras, i.e., the first to sixth cameras 112-1 to 112-6 to on-state. In the embodiment of the disclosure shown in FIG. 8B, the processor 130 may apply driving power to the fifth camera 112-5 that is closest to the location of the object 70 among the first to sixth cameras 112-1 to 112-6, and switch the fifth camera 112-5 to on-state. The processor 130 may obtain an image of the object 70 by photographing the object 70 located in the vicinity of the vehicle 10 using the fifth camera 112-5.

In the embodiments shown in FIGS. 6, 8A, and 8B, the electronic device 100 applies, based on information about the location and direction of the object 70 in the vicinity of the vehicle 10, driving power to only a camera (the 'fifth camera 112-5' in the embodiment of the disclosure shown in FIG. 8B) among the plurality of cameras, i.e., the first to sixth cameras 112-1 to 112-6, included in the black box 110, to switch the camera to an on-state, and captures an image of the object 70 by using the camera switched to the on-state, thereby reducing power consumption and thus providing a technical effect of improving power efficiency, compared to when capturing images of the object 70 by applying driving power to all of the plurality of cameras.

Figure 9:
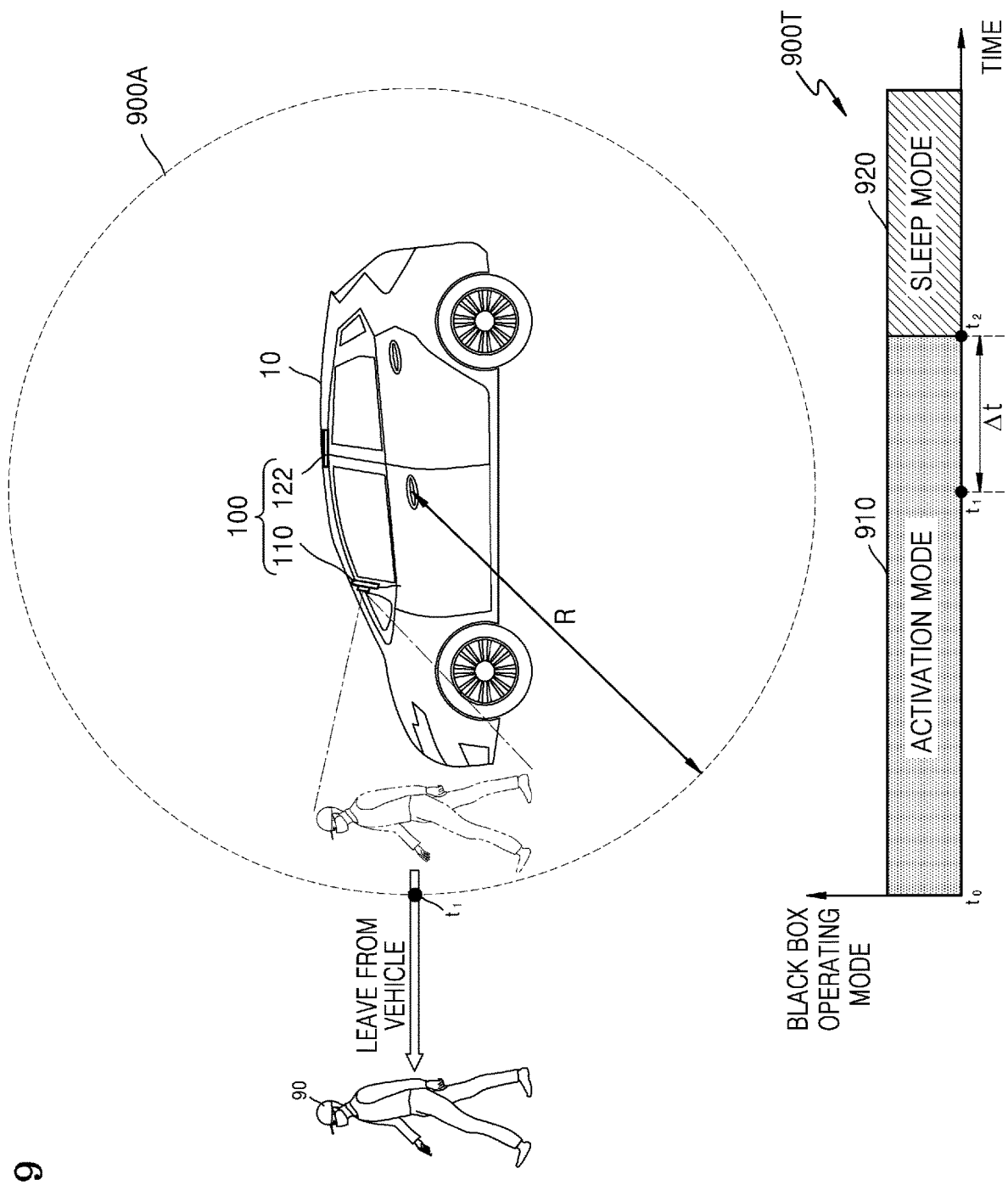
FIG. 9 is a diagram illustrating an operation in which an electronic device switches an operating mode of a black box when an object leaves vicinity of a vehicle according to an embodiment of the disclosure.

FIG. 9 is a diagram illustrating an operation in which an electronic device switches an operating mode of a black box when an object leaves vicinity of a vehicle according to an embodiment of the disclosure.

Referring to FIG. 9, the electronic device 100 may capture an image of the object 90 located within a preset area 900A around the vehicle 10 while the black box 110 is in an activation mode 910. The 'preset area 900A' refers to an area within a preset range from the vehicle 10. In the embodiment of the disclosure shown in FIG. 9, the preset area 900A may be an area defined as a circle with a center at a position of the vehicle 10 and a radius of a preset distance R. However, the preset area 900A is not limited thereto.

The electronic device 100 may transmit a UWB signal to the object 90 via the UWB communication module 122 and obtain location information about the object 90 based on a UWB signal reflected from the object 90. Because a specific method, performed by the electronic device 100, of obtaining ranging information indicating location information about the object 90 from a UWB signal is substantially the same as that described with reference to FIG. 7, a description thereof already provided above will be omitted here. The processor (130 of FIG. 2) of the electronic device 100 may obtain location information about the object 90 over time to track the location of the object 90, and identify a first time point $t_1$ at which the object 90 moves away from the vehicle 10 and then leaves the preset area 900A.

The processor 130 may capture an image of the object 90 by maintaining an operating mode of the black box 110 in the activation mode 910 even after the first time $t_1$ when the object 90 leaves the vicinity of the vehicle 10. Referring to a time table 900T, the processor 130 may maintain the operating mode of the black box 110 in the activation mode 910 for a predetermined time Δt even after the first time point $t_1$. The processor 130 may switch the operating mode of the black box 110 to a sleep mode 920 at a second time point $t_2$ occurring the predetermined time Δt after the first time point $t_1$. When the operating mode of the black box 110 is switched to the sleep mode 920, the camera of the black box 110 is turned off and stops capturing an image of the object 90.

In the embodiment of the disclosure shown in FIG. 9, the electronic device 100 captures an image of the object 90 by maintaining the operating mode of the black box 110 in the activation mode 910 for a certain time (e.g., Δt) even when the object 90 in the vicinity of the vehicle 10 leaves the preset area 900A around the vehicle 10, thereby enabling the driver, even when an outsider or an external object (e.g., another vehicle) quickly runs away after damaging the vehicle 10, to accurately obtain the identity of the outsider or identification information about the external object.

Figure 10:
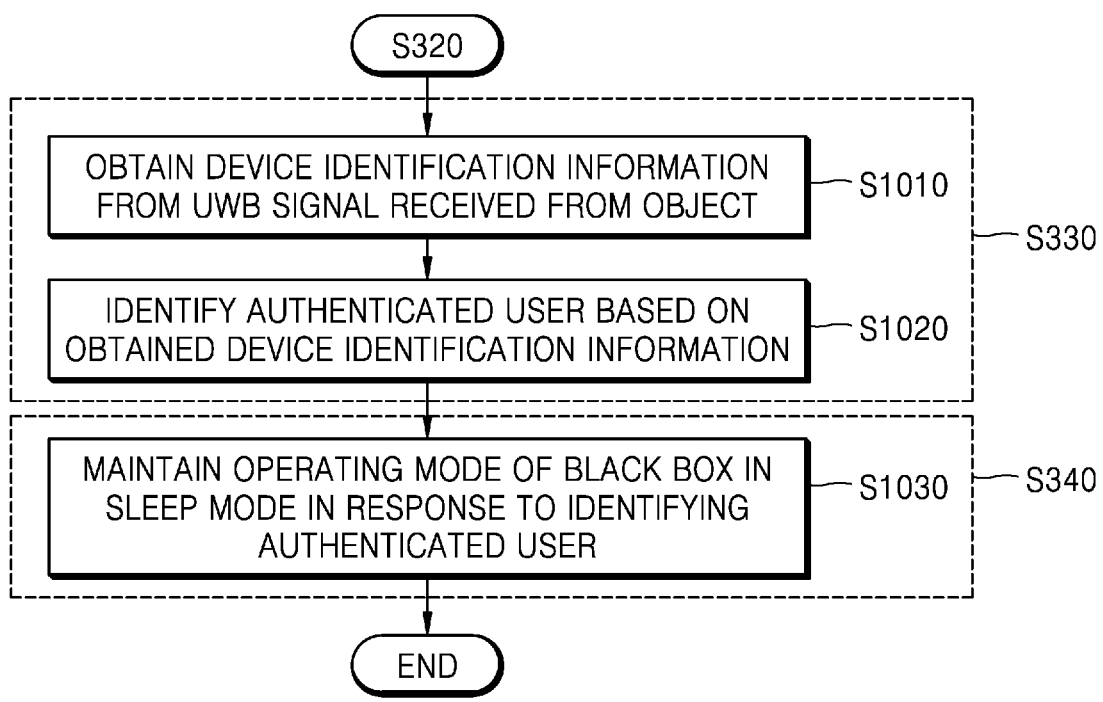
FIG. 10 is a flowchart of a method, performed by an electronic device, of determining whether to switch an operating mode of a black box in response to identifying an authenticated user according to an embodiment of the disclosure.

FIG. 10 is a flowchart of a method, performed by an electronic device of determining whether to switch an operating mode of a black box in response to identifying an authenticated user according to an embodiment of the disclosure.

Referring to FIG. 10, operations S1010 and S1020 shown in FIG. 10 are detailed operations of operation 8330 shown in FIG. 3. Operation 81030 shown in FIG. 10 is a detailed operation of operation S340 of FIG. 3. Operation S1010 shown in FIG. 10 may be performed after operation S320 of FIG. 3 is performed.

In operation S1010, the electronic device 100 obtains device identification information from the UWB signal received from the object. The electronic device 100 may detect, via the UWB communication module, a UWB signal reflected or received from the object. In an embodiment of the disclosure, when the object located in the vicinity of the vehicle has a UWB communication function, the electronic device 100 may receive a UWB impulse signal from the object via the UWB communication module (122 of FIG. 2). The electronic device 100 may obtain device identification information from the received UWB impulse signal.

In operation S1020, the electronic device 100 identifies an authenticated user based on the obtained device identification information. In an embodiment of the disclosure, an 'authenticated user' refers to a user having authority to operate or control the vehicle. The authenticated user is described with reference to FIG. 11.

Figure 11:
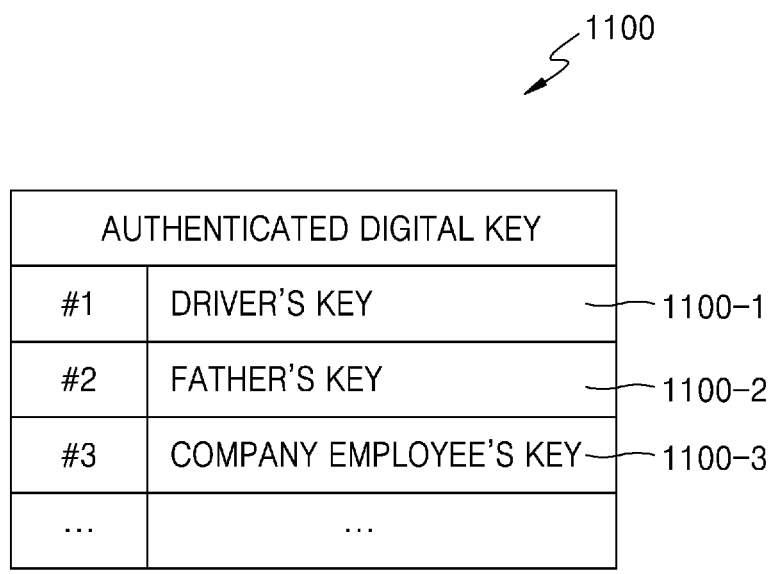
FIG. 11 is a diagram illustrating identification information about an authenticated user according to an embodiment of the disclosure.

FIG. 11 is a diagram illustrating identification information about an authenticated user according to an embodiment of the disclosure.

Referring to FIG. 11, it illustrates an authenticated digital key 1100 for an authenticated user having authority to control a vehicle, such as to access, start, operate, and/or control functions of the vehicle. The authenticated digital key 1100 may store not only a driver's digital key 1100-1 but also digital keys 1100-2 and 1100-3 of registered users who are not the driver. For example, the authenticated digital key 1100 may store the digital key 1100-2 of a driver's parent or the digital key 1100-3 of a driver's company employee.

In an embodiment of the disclosure, the authenticated digital key 1100 may be stored in a storage space of the memory (140 of FIG. 2) of the electronic device 100. However, the authenticated digital key 1100 is not limited thereto, and may be stored in a server or another device (e.g., a mobile device). In this case, the electronic device 100 may receive information about the authenticated digital key 1100 from a server or another device via the communication interface (120 of FIG. 2).

The processor (130 of FIG. 2) of the electronic device 100 may obtain device identification information, e.g., a user's digital key, via a UWB signal received from the object, and determine whether the user is an authenticated user by comparing the obtained user's digital key with the authenticated digital key 1100 stored in the memory 140 or server.

Referring back to FIG. 10, in operation S1030, in response to identifying the authenticated user, the electronic device 100 maintains the operating mode of the black box in the sleep mode. When the authenticated user is identified, the electronic device 100 may not switch the operating mode of the black box. In the sleep mode, only minimal driving power is supplied to the black box, and the camera of the black box remains in an off-state and does not capture images of the surroundings of the vehicle.

According to the embodiment of the disclosure illustrated in FIGS. 10 and 11, the electronic device 100 may preregister a digital key of an authenticated user having authority to operate or control the vehicle, as well as a digital key of the driver of the vehicle, and not switch the operating mode of the black box to an activation mode even when the authenticated user approaches the vehicle, thereby reducing the amount of power consumed by the black box and improving the efficiency of power consumption when events, such as damage to the vehicle or theft of items from the vehicle are not expected to occur.

Figure 12:
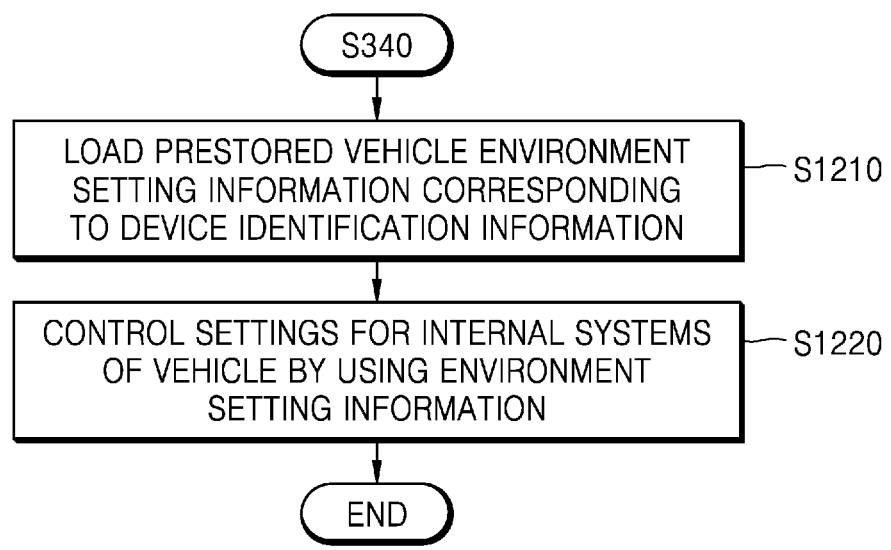
FIG. 12 is a flowchart of a method, performed by an electronic device, of controlling settings of an internal system of a vehicle based on device identification information according to an embodiment of the disclosure.

FIG. 12 is a flowchart of a method, performed by an electronic device of controlling settings of an internal system of a vehicle based on device identification information according to an embodiment of the disclosure.

Referring to FIG. 12, operations S1210 and S1220 shown in FIG. 12 may be performed after operation S340 shown in FIG. 3 is performed.

In operation S1210, the electronic device 100 loads prestored vehicle environment setting information corresponding to the device identification information. In an embodiment of the disclosure, 'device identification information' may include information about a digital key obtained from a UWB signal received from the object. The electronic device 100 may obtain vehicle environment setting information based on a mapping relationship between the obtained digital key and vehicle environment setting information. A 'mapping relationship between a digital key and vehicle environment setting information' refers to a preregistered correspondence relationship between identification information about at least one digital key and information about at least one environment setting in the vehicle. The vehicle environment setting information may include, for example, setting value information regarding at least one of a vehicle interior temperature setting, a navigation setting, a driver and passenger seat setting, a steering wheel angle setting, a multimedia operation setting, a vehicle interior lighting setting, a central information display (CID) setting, or an instrument panel setting.

In an embodiment of the disclosure, the mapping relationship between the digital key and the vehicle environment setting information may be stored in the memory (140 of FIG. 2). The processor 130 of the electronic device 100 may load environment setting information corresponding to identification information about a digital key identified from the object by referring to information about the mapping relationship stored in the memory 140.

In operation S1220, the electronic device 100 controls settings for internal systems of the vehicle by using the vehicle environment setting information. In an embodiment of the disclosure, the electronic device 100 may control the internal systems of the vehicle by using setting value information corresponding to each of the internal systems of the vehicle in the environment setting information. For example, by using environment setting information obtained according to identification information about a digital key of the identified object, the electronic device 100 may control an air conditioning system to set the temperature inside the vehicle to 24° C., control a seat to adjust an angle of a driver seat to 100°, and control a multimedia device to play music.

According to the embodiment of the disclosure illustrated in FIG. 12, the electronic device 100 may obtain identification information (e.g., a digital key) about the object from a UWB signal received from the object approaching the vehicle, and control internal systems of the vehicle based on the obtained identification information, thereby reducing inconvenience of having to individually set a temperature, a seat, a steering wheel angle, or the like, for each user when the vehicle is used by multiple users, and increasing user convenience.

Figure 13:
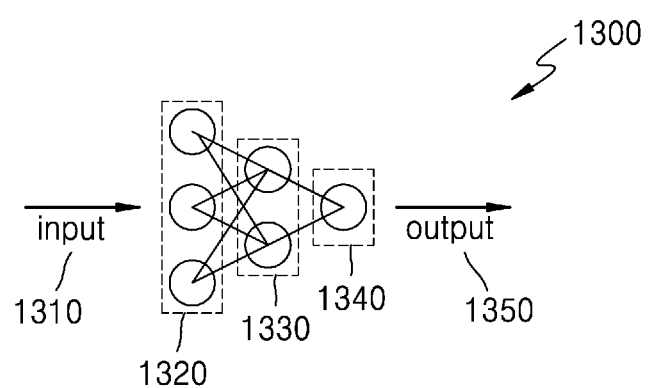
FIG. 13 is a diagram illustrating operations performed by an electronic device using artificial intelligence (AI) technology according to an embodiment of the disclosure.

FIG. 13 is a diagram illustrating operations performed by an electronic device using AI technology according to an embodiment of the disclosure.

Referring to FIG. 13, at least one of i) an operation of identifying whether an object is a device of a driver of a vehicle based on a UWB signal reflected or received from the object or ii) an operation of determining, based on a result of the identifying of the object, whether to switch an operating mode of a black box from a sleep mode to an activation mode may be performed by the electronic device 100 using AI technology that enables computations to be performed via a neural network.

AI technology is a technology for obtaining a desired result by performing processing, such as analysis and/or classification on input data based on computations via a neural network.

The AI technology may be implemented using algorithms. In this case, an algorithm or a set of algorithms for implementing the AI technology are referred to as a neural network. Here, the neural network may receive input data, perform computations for the analysis and/or the classification, and output resultant data. In order for the neural network to accurately output the resultant data corresponding to the input data, training the neural network is needed. In this case, 'training' may refer to training the neural network to discover or learn on its own a method of analyzing pieces of input data fed to the neural network, a method of classifying the pieces of input data, and/or a method of extracting features necessary for generating resultant data from the pieces of input data. Through a training process, the neural network may optimize weight values therein by being trained using training data (e.g., a plurality of different images). Then, a desired result is output by processing input data via the neural network having the optimized weight values.

When the neural network includes a plurality of hidden layers which are interior layers for performing computations, i.e., when a depth of the neural network where computations occur increases, the neural network may be classified as a deep neural network (DNN). For example, the neural network includes, but is not limited to, a convolutional neural network (CNN), a recurrent neural network (RNN), a restricted Boltzmann machine (RBM), a deep belief network (DBN), a bidirectional recurrent DNN (BRDNN), a deep Q-network (DQN), or the like. Furthermore, the neural network may be subdivided. Furthermore, a CNN may be subdivided into a deep CNN (DCNN), a capsule neural network (Capsnet) (not shown), or the like.

An 'AI model' may be a neural network including at least one layer operating to receive input data and output a desired result. Furthermore, the 'AI model' may refer to an algorithm or a set of a plurality of algorithms for performing computations via a neural network and outputting a desired result, a processor for executing the algorithm (or set of algorithms), software for executing the algorithm (or set of algorithms), or hardware for executing the algorithm (or set of algorithms).

The at least one of i) the operation of identifying whether the object is the device of the driver of the vehicle based on the UWB signal reflected or received from the object or ii) the operation of determining, based on the result of the identifying of the object, whether to switch the operating mode of the black box from the sleep mode to the activation mode may be performed based on the AI model.

Referring to FIG. 13, a neural network 1300 may receive training data and be trained based on the training data. In addition, the trained neural network 1300 may take input data 1310 as an input to an input terminal 1320, and the input terminal 1320, a hidden layer 1330, and an output terminal 1340 may each perform computations for analyzing the input data 1310 and data from a previous layer and outputting output data 1350. Although FIG. 13 shows that the hidden layer 1330 is a single layer, this is merely an example, and the hidden layer 1330 may include a plurality of layers.

In an embodiment of the disclosure, the neural network 1300 may be trained to identify a device preregistered as the driver of the vehicle based on a UWB signal received from the object and to maintain, in response to identifying the object as being the device of the driver of the vehicle, the operating mode of the black box in the sleep mode without switching the operating mode thereof.

In an embodiment of the disclosure, the neural network 1300 may be trained to identify an unregistered outsider who is not the driver of the vehicle or an unregistered object based on a UWB signal reflected from the object, and in response to identifying the unregistered outsider or unregistered object, wake up the black box to switch the operating mode of the black box from the sleep mode to the activation mode.

In an embodiment of the disclosure, the neural network 1300 may be trained to recognize whether a location of the object is outside an area within a preset range from the vehicle, capture an image of the object by maintaining the operating mode of the black box in the activation mode for a predetermined time, and switch the operating mode of the black box to the sleep mode after a lapse of the predetermined time.

In an embodiment of the disclosure, the neural network 1300 may be trained to identify a path of movement of the object by tracking a location and a direction of the identified object over time, and to determine, based on the path of movement of the object, whether to switch the operating mode of the black box from the sleep mode to the activation mode.

In an embodiment of the disclosure, data or program code related to the neural network 1300 for performing the at least one of i) the operation of identifying whether the object is the device of the driver of the vehicle based on the UWB signal reflected or received from the object or ii) the operation of determining, based on the result of the identifying of the object, whether to switch the operating mode of the black box from the sleep mode to the activation mode may be stored in the memory (140 of FIG. 2), and training of the neural network 1300 may be performed by the processor (130 of FIG. 2). In this case, the processor 130 may include a dedicated AI processor, such as an NPU.

Alternatively, the neural network 1300 for performing the at least one of i) the operation of identifying whether the object is the device of the driver of the vehicle based on the UWB signal reflected or received from the object or ii) the operation of determining, based on the result of the identifying of the object, whether to switch the operating mode of the black box from the sleep mode to the activation mode may be implemented in a separate electronic device (not shown) or a processor (not shown) distinguished from the electronic device 100.

The computations via the neural network 1300 may also be performed by a server (300 of FIGS. 14 and 15) capable of communicating with the electronic device 100 via a wireless communication network, according to an embodiment of the disclosure. A communication between the electronic device 100 and the server 300 is described with reference to FIGS. 14 and 15.

Figure 14:
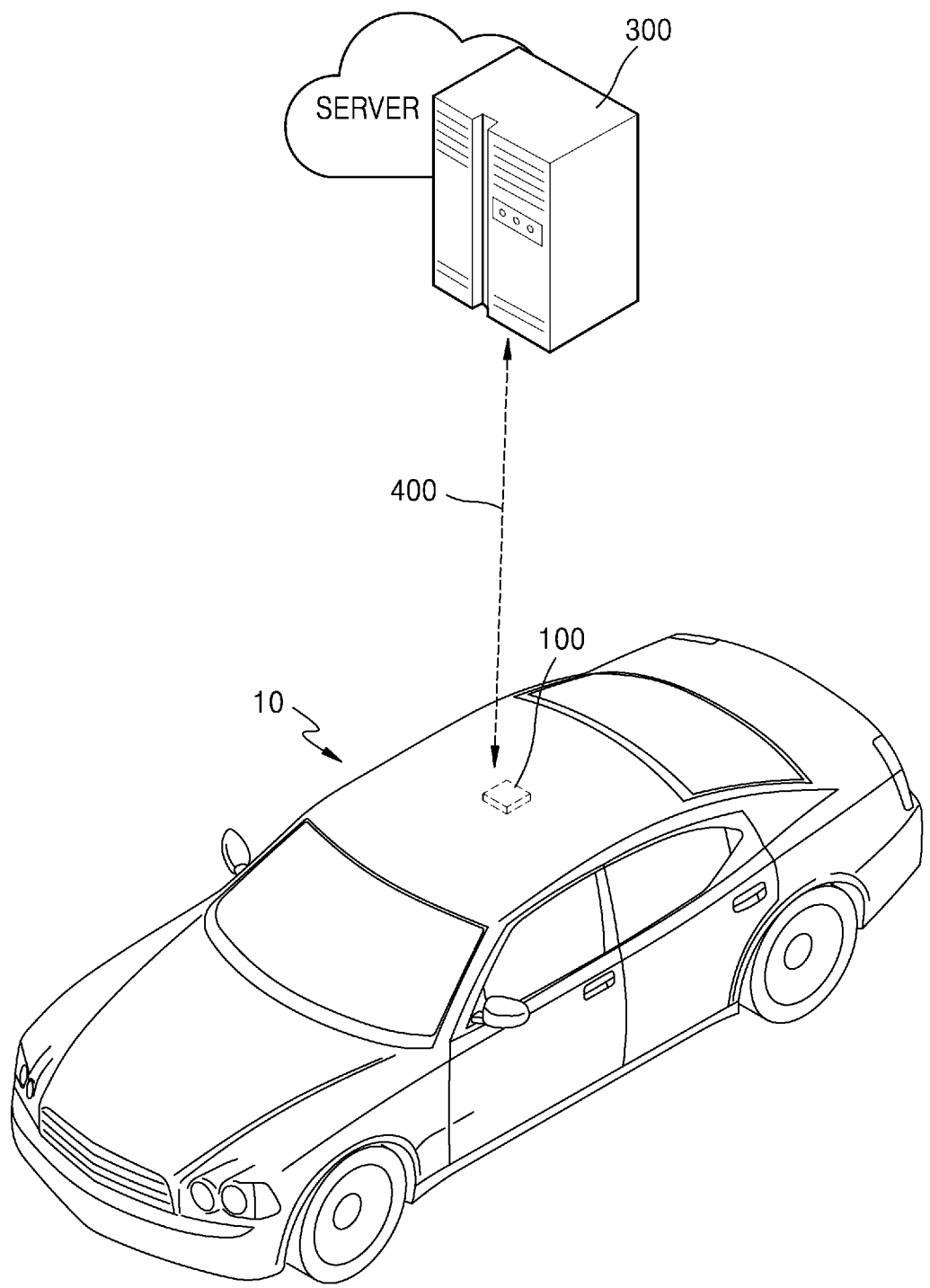
FIG. 14 is a diagram illustrating an electronic device operating in conjunction with a server according to an embodiment of the disclosure.

FIG. 14 is a diagram illustrating an electronic device operating in conjunction with a server according to an embodiment of the disclosure.

The server 300 may transmit and receive data to and from the electronic device 100 via a communication network 400 and process the data.

Figure 15:
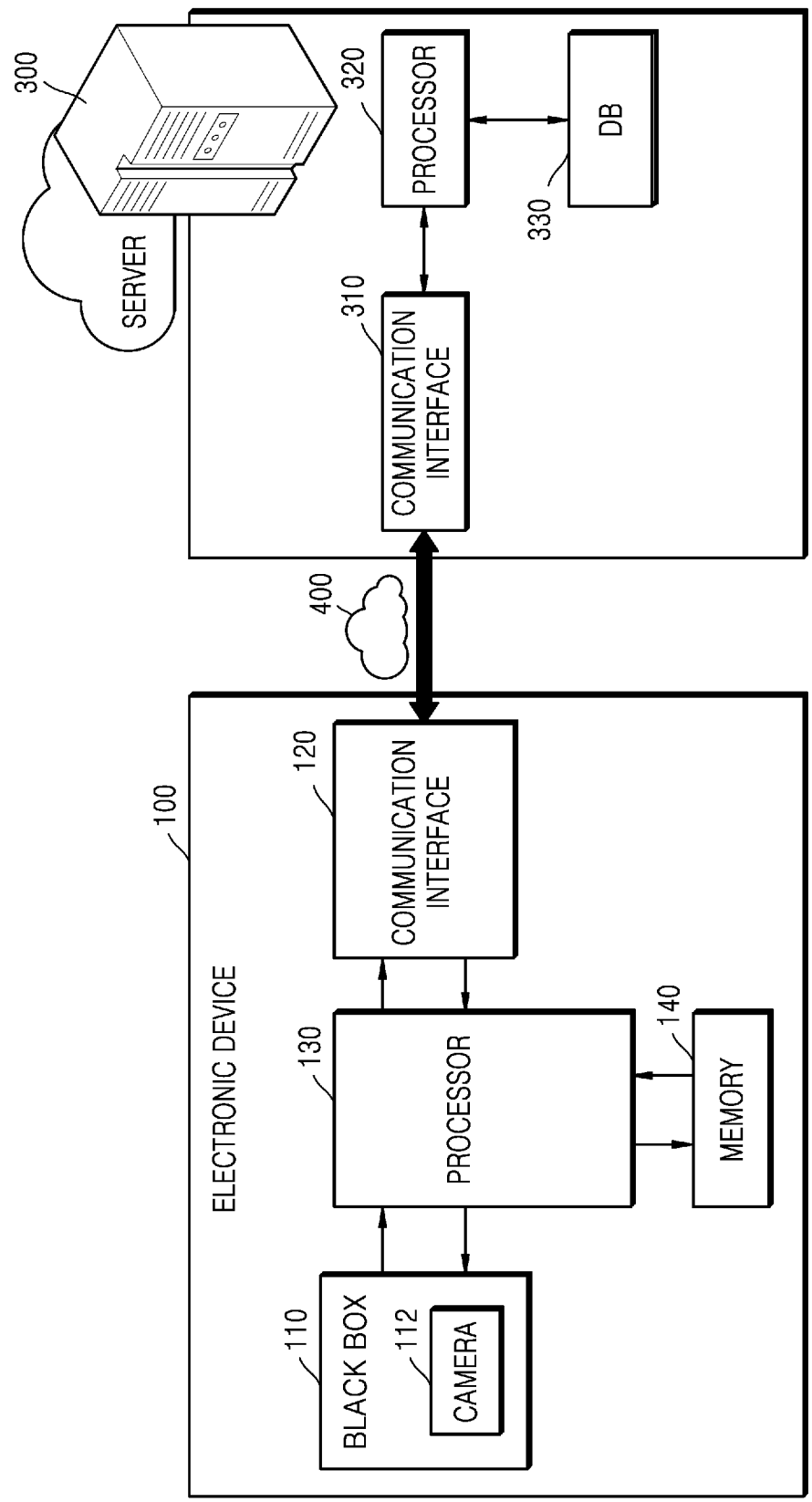
FIG. 15 is a diagram illustrating an electronic device and a server of FIG. 14 according to an embodiment of the disclosure.

Referring to FIGS. 14 and 15, the server 300 may include a communication interface 310 communicating with the electronic device 100, a processor 320 for performing at least one instruction, and a database (DB) 330.

The server 300 may train an AI model and store the trained AI model. Furthermore, the server 300 may use the trained AI model to perform at least one of i) an operation of identifying whether an object is a device of a driver of a vehicle based on a UWB signal reflected or received from the object or ii) an operation of determining, based on a result of the identifying of the object, whether to switch an operating mode of a black box from a sleep mode to an activation mode.

In general, the electronic device 100 may have limited storage capacity of the memory (140 of FIG. 2), limited computation processing speed of the processor (130 of FIG. 2), limited training data set collection capability, or the like, compared to the server 300. Thus, the server 300 may perform operations requiring storage of a large amount of data and a large number of computations, and then transmit necessary data and/or an AI model to the electronic device 100 via the communication network 400. Thereafter, the electronic device 100 may receive and use the necessary data and/or the AI model via the server 300 to thereby quickly and easily perform necessary operations without large capacity memory and a processor with high-speed computation capability.

In an embodiment of the disclosure, the server 300 may include the neural network 1300 described with reference to FIG. 13.

FIG. 15 is a diagram illustrating an electronic device and a server of FIG. 141 according to an embodiment of the disclosure.

Referring to FIG. 15, the server 300 may include the communication interface 310, the processor 320, and the DB 330.

The communication interface 310 communicates with an external device (not shown) via a wireless communication network. Here, the external device may include a server capable of performing at least one of computations required by the electronic device 100 or transmitting data required by the electronic device 100.

The communication interface 310 may include at least one communication module, such as a short-range communication module, a wired communication module, a mobile communication module, a broadcast receiving module, or the like. Here, the at least one communication module includes at least one of a tuner for performing broadcast reception or a communication module capable of performing data transmission and reception via a network that conforms to communication standards, such as Bluetooth, wireless local area network (WLAN), (or Wi-Fi), Wibro, Wimax, CDMA, WCDMA, the Internet, 3G, 4G, $5^{th}$ generation (5G), and/or a communication method using a millimeter wave (mmWave).

A mobile communication module included in the communication interface 310 may communicate with another device (e.g., the electronic device 100) located at a remote location via the communication network 400 conforming to communication standards, such as 3G, 4G (LTE), and/or 5G. In this case, a communication module that communicates with the other device located at the remote location may be referred to as a 'remote communication module'. In an embodiment of the disclosure, the communication interface 310 of the server 300 may transmit and receive data to and from the communication interface 120 of the electronic device 100 in a wired or wireless manner.

The processor 320 controls all operations of the server 300. For example, the processor 320 may perform required operations by executing at least one instruction or at least one of programs stored in the server 300.

The DB 330 may include memory (not shown), and store, in the memory, at least one of at least one instruction, program, or data necessary for the server 300 to perform a certain operation. Furthermore, the DB 330 may store pieces of data necessary for the server 300 to perform computations via a neural network.

In an embodiment of the disclosure, the server 300 may store the neural network 1300 described with reference to FIG. 13. The neural network 1300 may be stored in at least one of the processor 320 or the DB 330. The neural network 1300 included in the server 300 may be a trained neural network.

Furthermore, the server 300 may transmit the trained neural network (1300 of FIG. 13) to the communication interface 120 of the electronic device 100 via the communication interface 310. The electronic device 100 may obtain and store the trained neural network 1300, and obtain desired output data via the neural network 1300.

The disclosure provides a method, performed by the electronic device 100, of controlling the black box 110 mounted in the vehicle 10. An operation method of the electronic device 100 according to an embodiment of the disclosure may include determining an operating mode of the black box 110 to be a sleep mode in a state that an engine of the vehicle 10 is turned off (performed in operation S310). According to an embodiment of the disclosure, the operation method of the electronic device 100 may include transmitting, by using the UWB communication module 122, a UWB signal to an object located in the vicinity of the vehicle 10 and receiving a UWB signal from the object (performed in operation S320). According to an embodiment of the disclosure, the operation method of the electronic device 100 may include identifying, based on the received UWB signal, whether the object is a device of a driver of the vehicle 10 (performed in operation S330). According to an embodiment of the disclosure, the operation method of the electronic device 100 may include determining, based on a result of the identifying of the object, whether to switch the operating mode of the black box 110 from the sleep mode to an activation mode (performed in operation S340).

In an embodiment of the disclosure, in the identifying of whether the object is the device of the driver of the vehicle 10 (performed in operation S330), the electronic device 100 may identify, based on the UWB signal received from the object, a device preregistered as the driver of the vehicle 10. In the determining of whether to switch the operating mode of the black box 110 (performed in operation S340), in response to identifying the object as being the device of the driver of the vehicle 10, the electronic device 100 may not switch the operating mode of the black box 110 but maintain it in the sleep mode.

In an embodiment of the disclosure, in the identifying of whether the object is the device of the driver of the vehicle 10 (performed in operation S330), the electronic device 100 may identify an unregistered outsider who is not the driver of the vehicle 10 or an unregistered object based on the UWB signal reflected from the object and detected by the UWB communication module 122. The determining of whether to switch the operating mode of the black box 110 (performed in operation 8340) may include, in response to identifying the unregistered outsider or unregistered object, waking up the black box 110 to switch the operating mode of the black box 110 from the sleep mode to the activation mode.

In an embodiment of the disclosure, the operation method of the electronic device 100 may further include, in response to switching the operating mode of the black box 110 to the activation mode, switching a camera included in the black box 110 to an on-state and obtaining an image of the surroundings of the vehicle 10 by photographing the unregistered outsider or unregistered object via the camera (performed in operation 8440).

In an embodiment of the disclosure, the operation method of the electronic device 100 may further include transmitting, to the device of the driver, a notification message that notifies the driver about information about the switching of the operating mode of the black box 110 and start of the photographing (performed in operation 8530).

In an embodiment of the disclosure, the black box 110 may include a plurality of cameras disposed at different locations on the vehicle 10. The obtaining of the image of the surroundings of the vehicle 10 (performed in operation 8440) may include obtaining information about a location and a direction of the object based on the UWB signal reflected from the object and detected by the UWB communication module 122 (performed in operation 8610) and obtaining an image of the surroundings of the vehicle 10 by photographing the object by using a camera disposed closest to the location and direction of the object among the plurality of cameras (performed in operation 8620).

In an embodiment of the disclosure, the obtaining of the information about the location and direction of the object may include obtaining ranging information and AOA information from the UWB signal reflected from the object and detected by the UWB communication module 122. The obtaining of the information about the location and direction of the object may include obtaining the location and the direction of the object, based on the obtained ranging information and AOA information.

In an embodiment of the disclosure, the operation method of the electronic device 100 may further include, when the location of the object is outside an area within a preset range from the vehicle 10, capturing an image of the object by maintaining the operating mode of the black box 110 in the activation mode for a predetermined time, and switching the operating mode of the black box 110 to the sleep mode after a lapse of the predetermined time.

In an embodiment of the disclosure, device identification information about an authenticated user having authority to operate or control the vehicle 10 in addition to the driver of the vehicle 10 may be preregistered. The identifying of whether the object is the device of the driver of the vehicle 10 (performed in operation 8330) may include obtaining device identification information from the UWB signal received from the object (performed in operation S1010) and identifying an authenticated user based on the obtained device identification information (performed in operation S1020). The determining of whether to switch the operating mode of the black box 110 (performed in operation 8340) may include, in response to identifying the authenticated user, maintaining the operating mode of the black box 110 in the sleep mode (performed in operation 81030).

The disclosure provides the electronic device 100 mounted on the vehicle 10. In an embodiment of the disclosure, the electronic device 100 may include the UWB communication module 122, the black box 110 including at least one camera and configured to capture an image of an object in the vicinity of the vehicle 10 using the at least one camera, the memory 140 storing at least one instruction, and at least one processor 130 configured to execute the at least one instruction. The at least one processor 130 may be further configured to determine an operating mode of the black box 110 to be a sleep mode in a state that an engine of the vehicle 10 is turned off. The at least one processor 130 may be further configured to control the UWB communication module 122 to transmit a UWB signal to an object located in the vicinity of the vehicle 10 and receive a UWB signal from the object. The at least one processor 130 may be further configured to identify, based on the received UWB signal, whether the object is a device of a driver of the vehicle 10. The at least one processor 130 may be further configured to determine, based on a result of the identifying of the object, whether to switch the operating mode of the black box 110 from the sleep mode to an activation mode.

In an embodiment of the disclosure, the at least one processor 130 may be further configured to identify, based on the UWB signal received from the object, a device preregistered as the driver of the vehicle 10. The at least one processor 130 may be further configured to, in response to identifying the object as being the device of the driver of the vehicle 10, maintain the operating mode of the black box 110 in the sleep mode without switching the operating mode thereof.

In an embodiment of the disclosure, the UWB communication module (122) may be configured to detect the UWB signal reflected from the object. The at least one processor 130 may be further configured to identify an unregistered outsider who is not the driver of the vehicle 10 or an unregistered object based on the detected UWB signal. The at least one processor 130 may be further configured to, in response to identifying the unregistered outsider or unregistered object, wake up the black box 110 to switch the operating mode of the black box 110 from the sleep mode to the activation mode.

In an embodiment of the disclosure, the at least one processor 130 may be further configured to, in response to switching the operating mode of the black box 110 to the activation mode, switch a camera included in the black box 110 to an on-state and obtain an image of the surroundings of the vehicle 10 by photographing the unregistered outsider or unregistered object via the camera.

In an embodiment of the disclosure, the electronic device 100 may further include the communication interface 120 configured to perform data communication with a server or an external device. The at least one processor 130 may be further configured to control the communication interface 120 to transmit, to the device of the driver, a notification message that notifies the driver about information about the switching of the operating mode of the black box 110 and start of the photographing.

In an embodiment of the disclosure, the UWB communication module 122 may be configured to detect the UWB signal reflected from the object. The black box 110 may include a plurality of cameras disposed at different locations on the vehicle 10. The at least one processor 130 may be further configured to obtain information about a location and a direction of the object based on the detected UWB signal. The at least one processor 130 may be further configured to control the black box 110 to obtain an image of the surroundings of the vehicle 10 by photographing the object by using a camera disposed closest to the location and direction of the object among the plurality of cameras.

In an embodiment of the disclosure, the UWB communication module 122 may be configured to detect the UWB signal reflected from the object. The at least one processor 130 may be further configured to obtain ranging information and AOA information from the detected UWB signal and obtain the location and the direction of the object, based on the obtained ranging information and AOA information.

In an embodiment of the disclosure, the at least one processor 130 may be further configured to identify a path of movement of the object by tracking a location and a direction of the identified object over time. The at least one processor 130 may be further configured to determine, based on the path of movement of the object, whether to switch the operating mode of the black box 110.

In an embodiment of the disclosure, the at least one processor 130 may be further configured to, when the location of the object is outside an area within a preset range from the vehicle 10, control the black box 110 to capture an image of the object by maintaining the operating mode of the black box in the activation mode for a predetermined time. The at least one processor 130 may be further configured to switch the operating mode of the black box to the sleep mode after a lapse of the predetermined time.

In an embodiment of the disclosure, the memory 140 may store device identification information about an authenticated user having authority to operate or control the vehicle 10 in addition to the driver of the vehicle 10. The at least one processor 130 may be further configured to obtain device identification information from the UWB signal received from the object, and identify the authenticated user by comparing the obtained device identification information with the device identification information about the authenticated user stored in the memory 140. The at least one processor 130 may be further configured to, in response to identifying the authenticated user, maintain the operating mode of the black box 110 in the sleep mode.

The disclosure provides a computer program product including a computer-readable storage medium. The storage medium may include instructions that are readable by the electronic device 100 to determine an operating mode of the black box 110 to be a sleep mode in a state that an engine of the vehicle 10 is turned off, transmit, by using the UWB communication module 12, a UWB signal to an object located in the vicinity of the vehicle 10 and receive a UWB signal from the object, identify, based on the received UWB signal, whether the object is a device of a driver of the vehicle 10, and determine, based on a result of the identifying of the object, whether to switch the operating mode of the black box 110 from the sleep mode to an activation mode.

A program executed by the electronic device 100 described in this specification may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, or the like), optical recording media (e.g., compact disc (CD)-ROM, and a digital versatile disc (DVD)), or the like. The computer-readable recording media may be distributed over computer systems connected through a network so that computer-readable code may be stored and executed in a distributed manner. The media may be read by a computer, stored in memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of the electronic device 100 or through an electronic market (e.g., Samsung Galaxy Store™ and Google Play Store™). For such electronic distribution, at least a part of the software program may be stored in the storage medium or may be temporarily generated. In this case, the storage medium may be a storage medium of a cloud server of a manufacturer of the vehicle 10 or a server of a manufacturer of the electronic device 100, a server of the electronic market, or a relay server for temporarily storing the software program.

In a system consisting of the electronic device 100, the server (300 of FIGS. 14 and 15), and another electronic device, the computer program product may include a storage medium of the server 300 or a storage medium of the other electronic device. Alternatively, in a case where there is a third device (e.g., a mobile device, such as a smartphone) communicatively connected to the electronic device 100, the computer program product may include a storage medium of the third device. Alternatively, the computer program product may include a software program itself that is transmitted from the electronic device 100 to the other electronic device or the third device or that is transmitted from the third device to the electronic device 100.

In this case, one of the electronic device 100, the other electronic device, and the third device (e.g., the mobile device, such as a smartphone) may execute the computer program product to perform methods according to embodiments of the disclosure. Alternatively, two or more of the electronic device 100, the other electronic device, and the third device may execute the computer program product to perform the methods according to the embodiments of the disclosure in a distributed manner.

For example, the electronic device 100 may execute the computer program product stored in the memory (140 of FIG. 2) to control the other electronic device communicatively connected to the electronic device 100 to perform the methods according to the embodiments of the disclosure.

In another example, the third device may execute the computer program product to control the other electronic device communicatively connected to the third device to perform the methods according to the embodiments of the disclosure.

In a case where the third device executes the computer program product, the third device may download the computer program product from the electronic device 100 and execute the downloaded computer program product. Alternatively, the third device may execute the computer program product that is pre-loaded therein to perform the methods according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by an electronic device, of controlling a black box mounted in a vehicle, the method comprising:

determining an operating mode of the black box to be a sleep mode in a state that an engine of the vehicle is turned off;

transmitting, by using an ultra-wideband (UWB) communication module, a UWB signal to an object located in a vicinity of the vehicle and receiving a UWB signal from the object;

identifying, from the received UWB signal, an authentication key which is pre-registered for a device of a driver of the vehicle;

determining, based on the identified authentication key, whether the object is the device of the driver of the vehicle; and determining, based on a result of the determination, whether to switch the operating mode of the black box from the sleep mode to an activation mode, wherein the determining of whether to switch the operating mode of the black box comprises:

based on a determination that the object is not the device of the driver of the vehicle, switching the operating mode of the black box from the sleep mode to the activation mode by waking-up the black box; and obtaining, by using a camera included in the black box, an image of surroundings of the vehicle by photographing the object.

2. The method of claim 1,
wherein the determining of whether the object is the device of the driver of the vehicle comprises:
determining, based on the identified authentication key, a device preregistered as the driver of the vehicle, and
wherein the determining of whether to switch the operating mode of the black box comprises:
in response to the object being identified as the device of the driver of the vehicle, maintaining the operating mode of the black box in the sleep mode without switching the operating mode thereof.

3. The method of claim 1,
wherein the determining of whether the object is the device of the driver of the vehicle comprises:
identifying an unregistered outsider who is not the driver of the vehicle or an unregistered object, based on the UWB signal reflected from the object and detected by the UWB communication module, and
wherein the determining of whether to switch the operating mode of the black box comprises:
in response to the unregistered outsider or the unregistered object being identified, waking up the black box to switch the operating mode of the black box from the sleep mode to the activation mode.

4. The method of claim 1,
wherein device identification information about an authenticated user having authority to operate or control the vehicle in addition to the driver of the vehicle is preregistered,
wherein the identifying of whether the object is the device of the driver of the vehicle comprises:
obtaining the device identification information from the UWB signal received from the object, and
identifying the authenticated user, based on the obtained device identification information, and
wherein the determining of whether to switch the operating mode of the black box comprises:
in response to the authenticated user being identified, maintaining the operating mode of the black box in the sleep mode.

5. The method of claim 3, further comprising:
in response to the switching of the operating mode of the black box to the activation mode, switching a camera included in the black box to an on-state; and
obtaining an image of surroundings of the vehicle by photographing the unregistered outsider or unregistered object by using the camera.

6. The method of claim 3, further comprising:
transmitting, to the device of the driver, a notification message that notifies the driver about information about the switching of the operating mode of the black box and start of the photographing.

7. The method claim 3, further comprising:
when the location of the object is outside an area within a preset range from the vehicle, capturing an image of the object by maintaining the operating mode of the black box in the activation mode for a predetermined time; and
switching the operating mode of the black box to the sleep mode after a lapse of the predetermined time.

8. An electronic device mounted on a vehicle, the electronic device comprising:
an ultra-wideband (UWB) communication module;
a black box including at least one camera and configured to capture an image of an object in a vicinity of a vehicle by using the at least one camera;
memory storing at least one instruction; and
at least one processor configured to execute the at least one instruction to:
determine an operating mode of the black box to be a sleep mode in a state that an engine of the vehicle is turned off,
control the UWB communication module to transmit a UWB signal to an object located in the vicinity of the vehicle and receive a UWB signal from the object,
identify, from the received UWB signal, an authentication key which is pre-registered for a device of a driver of the vehicle,
determine, based on the identified authentication key, whether the object is the device of the driver of the vehicle, and
determine, based on a result of the determination, whether to switch the operating mode of the black box from the sleep mode to an activation mode,
wherein the at least one processor is further configured to execute the at least one instruction to:
based on a determination that the object is not the device of the driver of the vehicle, switch the operating mode of the black box from the sleep mode to the activation mode by waking-up the black box, and
obtain, by using a camera included in the black box, an image of surroundings of the vehicle by photographing the object.

9. The electronic device of claim 8, wherein the at least one processor is further configured to execute the at least one instruction to:
determine, based on the identified authentication key, a device preregistered as the driver of the vehicle; and
in response to the object being identified as the device of the driver of the vehicle, maintain the operating mode of the black box in the sleep mode without switching the operating mode thereof.

10. The electronic device of claim 8,
wherein the UWB communication module is configured to detect the UWB signal reflected from the object, and
wherein the at least one processor is further configured to execute the at least one instruction to:
identify an unregistered outsider who is not the driver of the vehicle or an unregistered object based on the detected UWB signal, and
in response to the unregistered outsider or unregistered object being identified, wake up the black box to switch the operating mode of the black box from the sleep mode to the activation mode.

11. The electronic device claim 8,
wherein the memory stores device identification information about an authenticated user having authority to operate or control the vehicle in addition to the driver of the vehicle, and
wherein the at least one processor is further configured to execute the at least one instruction to:
obtain device identification information from the UWB signal received from the object,
identify the authenticated user by comparing the obtained device identification information with the device identification information about the authenticated user stored in the memory, and
in response to the authenticated user being identified, maintain the operating mode of the black box in the sleep mode.

12. The electronic device of claim 10, wherein the at least one processor is further configured to execute the at least one instruction to:

in response to the switching of the operating mode of the black box to the activation mode, switch a camera included in the black box to an on-state; and obtain an image of surroundings of the vehicle by photographing the unregistered outsider or unregistered object by using the camera.

13. The electronic device of claim 10, further comprising:

a communication interface configured to perform data communication with a server or an external device, wherein the at least one processor is further configured to execute the at least one instruction to:

control the communication interface to transmit, to the device of the driver, a notification message that notifies the driver about information about the switching of the operating mode of the black box and start of the photographing.

14. The electronic device of claim 10, wherein the at least one processor is further configured to execute the at least one instruction to:

when the location of the object is outside an area within a preset range from the vehicle, control the black box to capture an image of the object by maintaining the operating mode of the black box in the activation mode for a predetermined time; and switch the operating mode of the black box to the sleep mode after a lapse of the predetermined time.

15. One or more non-transitory computer-readable storage media storing computer-executable instructions that, when executed by at least one processor of an electronic device, cause the electronic device to perform operations, the operations comprising:

determining an operating mode of a black box to be a sleep mode in a state that an engine of a vehicle is turned off;

transmitting, by using an ultra-wideband (UWB) communication module, a UWB signal to an object located in a vicinity of the vehicle and receive a UWB signal from the object;

identifying, from the received UWB signal, an authentication key which is pre-registered for a device of a driver of the vehicle;

determining, based on the identified authentication key, whether the object is the device of the driver of the vehicle, based on the received UWB signal; and determining, based on a result of the determination of the object, whether to switch the operating mode of the black box from the sleep mode to an activation mode, wherein the determining of whether to switch the operating mode of the black box comprises:

based on a determination that the object is not the device of the driver of the vehicle, switching the operating mode of the black box from the sleep mode to the activation mode by waking-up the black box; and obtaining, by using a camera included in the black box, an image of surroundings of the vehicle by photographing the object.

* * * * *